United States Patent
Alarcon Heredia et al.

(10) Patent No.: US 12,544,218 B2
(45) Date of Patent: Feb. 10, 2026

(54) LENSES HAVING MULTI-RING DESIGN FOR VISION TREATMENT

(71) Applicant: AMO Groningen B.V., Groningen (NL)

(72) Inventors: Aixa Alarcon Heredia, Groningen (NL); Miguel Faria Ribeiro, Braga (PT); Franck Gounou, Groningen (NL); Patricia A. Piers, Groningen (NL); Hendrik Weeber, Groningen (NL); Carmen Canovas Vidal, Groningen (NL); Robert Rosen, Groningen (NL)

(73) Assignee: AMO Groningen B.V., Groningen (NL)

( * ) Notice: Subject to any disclaimer, the term of this patent is extended or adjusted under 35 U.S.C. 154(b) by 637 days.

(21) Appl. No.: 18/061,382

(22) Filed: Dec. 2, 2022

(65) Prior Publication Data
US 2023/0172705 A1 Jun. 8, 2023

Related U.S. Application Data

(60) Provisional application No. 63/264,938, filed on Dec. 3, 2021.

(51) Int. Cl.
*A61F 2/16* (2006.01)
(52) U.S. Cl.
CPC .................. *A61F 2/1654* (2013.01)
(58) Field of Classification Search
CPC .................................... A61F 2/1654
See application file for complete search history.

(56) References Cited

U.S. PATENT DOCUMENTS

| | | |
|---|---|---|
| 2,077,092 A | 4/1937 | Simon |
| 3,305,294 A | 2/1967 | Alvarez |
| 3,367,734 A | 2/1968 | Karl et al. |
| 3,735,685 A | 5/1973 | Plummer |
| 4,010,496 A | 3/1977 | Neefe |
| 4,077,071 A | 3/1978 | Freeman |
| 4,093,361 A | 6/1978 | Erickson et al. |
| 4,134,160 A | 1/1979 | Bayers |
| 4,162,122 A | 7/1979 | Cohen |
| 4,174,543 A | 11/1979 | Kelman |
| 4,210,391 A | 7/1980 | Cohen et al. |

(Continued)

FOREIGN PATENT DOCUMENTS

| | | |
|---|---|---|
| CA | 2722274 A1 | 10/2009 |
| CN | 1035363 A | 9/1989 |

(Continued)

OTHER PUBLICATIONS

International Preliminary Report on Patentability, received for PCT Application No. PCT/US2009/034555, mailed on Aug. 24, 2010, 8 pages.

(Continued)

*Primary Examiner* — Javier G Blanco

(57) ABSTRACT

Apparatuses, systems and methods for providing improved ophthalmic lenses, particularly intraocular lenses (IOLs), include features for providing improved extended depth of focus lenses. Exemplary ophthalmic lenses can include an optic including a diffractive profile including multiple rings, with the rings having step heights corresponding to a desired performance of the optic and configured to reduce adverse optical effects of the diffractive profile.

11 Claims, 13 Drawing Sheets

(56) References Cited

U.S. PATENT DOCUMENTS

| | | |
|---|---|---|
| 4,249,272 A | 2/1981 | Poler |
| 4,254,509 A | 3/1981 | Tennant |
| 4,254,510 A | 3/1981 | Tennant |
| 4,316,293 A | 2/1982 | Bayers |
| 4,319,564 A | 3/1982 | Karickhoff |
| 4,338,005 A | 7/1982 | Cohen |
| 4,340,283 A | 7/1982 | Cohen |
| 4,370,760 A | 2/1983 | Kelman |
| 4,377,873 A | 3/1983 | Reichert, Jr. |
| 4,402,579 A | 9/1983 | Poler |
| 4,403,353 A | 9/1983 | Tennant |
| 4,404,694 A | 9/1983 | Kelman |
| 4,409,691 A | 10/1983 | Levy |
| 4,424,597 A | 1/1984 | Schlegel |
| 4,446,581 A | 5/1984 | Blake |
| 4,480,340 A | 11/1984 | Shepard |
| 4,500,382 A | 2/1985 | Foster |
| 4,504,982 A | 3/1985 | Burk |
| 4,551,864 A | 11/1985 | Akhavi |
| 4,556,998 A | 12/1985 | Siepser |
| 4,560,383 A | 12/1985 | Leiske |
| 4,593,981 A | 6/1986 | Scilipoti |
| 4,605,409 A | 8/1986 | Kelman |
| 4,605,411 A | 8/1986 | Fedorov et al. |
| 4,629,460 A | 12/1986 | Dyer |
| 4,629,462 A | 12/1986 | Feaster |
| 4,636,049 A | 1/1987 | Blaker |
| 4,637,697 A | 1/1987 | Freeman |
| 4,642,112 A | 2/1987 | Freeman |
| 4,655,565 A | 4/1987 | Freeman |
| 4,673,406 A | 6/1987 | Schlegel |
| 4,676,791 A | 6/1987 | LeMaster et al. |
| 4,676,792 A | 6/1987 | Praeger |
| 4,681,102 A | 7/1987 | Bartell |
| 4,687,484 A | 8/1987 | Kaplan |
| 4,687,485 A | 8/1987 | Lim et al. |
| RE32,525 E | 10/1987 | Pannu |
| 4,725,277 A | 2/1988 | Bissonette |
| 4,734,095 A | 3/1988 | Siepser |
| 4,778,462 A | 10/1988 | Grendahl |
| 4,781,717 A | 11/1988 | Grendahl |
| 4,787,903 A | 11/1988 | Grendahl |
| 4,787,904 A | 11/1988 | Severin et al. |
| 4,795,462 A | 1/1989 | Grendahl |
| 4,798,608 A | 1/1989 | Grendahl |
| 4,798,609 A | 1/1989 | Grendahl |
| 4,828,558 A | 5/1989 | Kelman |
| 4,834,748 A | 5/1989 | McDonald |
| 4,863,539 A | 9/1989 | Lee et al. |
| 4,898,461 A | 2/1990 | Portney |
| 4,932,970 A | 6/1990 | Portney |
| 4,995,714 A | 2/1991 | Cohen |
| 4,995,715 A | 2/1991 | Cohen |
| 4,997,442 A | 3/1991 | Barrett |
| 5,016,977 A | 5/1991 | Baude et al. |
| 5,019,097 A | 5/1991 | Knight et al. |
| 5,047,052 A | 9/1991 | Dubroff |
| 5,054,905 A | 10/1991 | Cohen |
| 5,056,908 A | 10/1991 | Cohen |
| 5,066,301 A | 11/1991 | Wiley |
| 5,071,432 A | 12/1991 | Baikoff |
| 5,078,742 A | 1/1992 | Dahan |
| 5,089,023 A | 2/1992 | Swanson |
| 5,096,285 A | 3/1992 | Silberman |
| 5,114,220 A | 5/1992 | Baude et al. |
| 5,117,306 A | 5/1992 | Cohen |
| 5,120,120 A | 6/1992 | Cohen |
| 5,121,979 A | 6/1992 | Cohen |
| 5,121,980 A | 6/1992 | Cohen |
| 5,133,749 A | 7/1992 | Nordan |
| 5,144,483 A | 9/1992 | Cohen |
| 5,147,395 A | 9/1992 | Willis |
| 5,147,397 A | 9/1992 | Christ et al. |
| 5,184,405 A | 2/1993 | Cress |
| 5,197,981 A | 3/1993 | Southard |
| 5,201,763 A | 4/1993 | Brady et al. |
| 5,203,790 A | 4/1993 | McDonald |
| 5,217,491 A | 6/1993 | Vanderbilt |
| 5,225,858 A | 7/1993 | Portney |
| 5,225,997 A | 7/1993 | Lederer et al. |
| 5,229,797 A | 7/1993 | Futhey et al. |
| 5,258,025 A | 11/1993 | Fedorov et al. |
| 5,278,592 A | 1/1994 | Marie et al. |
| 5,408,281 A | 4/1995 | Zhang |
| 5,433,745 A | 7/1995 | Graham et al. |
| 5,476,513 A | 12/1995 | Brady et al. |
| 5,479,220 A | 12/1995 | Komatsu et al. |
| 5,567,365 A | 10/1996 | Weinschenk, III et al. |
| 5,571,177 A | 11/1996 | Deacon et al. |
| 5,620,720 A | 4/1997 | Glick et al. |
| 5,628,796 A | 5/1997 | Suzuki |
| 5,652,638 A | 7/1997 | Roffman et al. |
| 5,691,800 A | 11/1997 | Iki et al. |
| 5,699,142 A | 12/1997 | Lee et al. |
| 5,715,031 A | 2/1998 | Roffman et al. |
| 5,716,403 A | 2/1998 | Tran et al. |
| 5,748,282 A | 5/1998 | Freeman |
| 5,760,871 A | 6/1998 | Kosoburd et al. |
| 5,796,462 A | 8/1998 | Roffman et al. |
| 5,801,807 A | 9/1998 | Satake et al. |
| 5,928,282 A | 7/1999 | Nigam |
| 5,968,094 A | 10/1999 | Werblin et al. |
| 6,015,435 A | 1/2000 | Valunin et al. |
| 6,051,024 A | 4/2000 | Cumming |
| 6,055,111 A | 4/2000 | Nomura et al. |
| 6,126,283 A | 10/2000 | Wen et al. |
| 6,126,286 A | 10/2000 | Portney |
| 6,129,759 A | 10/2000 | Chambers |
| 6,142,625 A | 11/2000 | Sawano et al. |
| 6,179,870 B1 | 1/2001 | Sourdille et al. |
| 6,210,005 B1 | 4/2001 | Portney |
| 6,235,055 B1 | 5/2001 | Chu |
| 6,261,321 B1 | 7/2001 | Kellan |
| 6,319,282 B1 | 11/2001 | Nishi |
| 6,338,559 B1 | 1/2002 | Williams et al. |
| 6,419,697 B1 | 7/2002 | Kelman |
| 6,457,826 B1 | 10/2002 | Lett |
| 6,464,355 B1 | 10/2002 | Gil |
| 6,474,814 B1 | 11/2002 | Griffin |
| 6,488,708 B2 | 12/2002 | Sarfarazi |
| 6,491,721 B2 | 12/2002 | Freeman et al. |
| 6,527,389 B2 | 3/2003 | Portney |
| 6,533,416 B1 | 3/2003 | Fermigier et al. |
| 6,536,899 B1 | 3/2003 | Fiala |
| 6,537,317 B1 | 3/2003 | Steinert et al. |
| 6,547,822 B1 | 4/2003 | Lang |
| 6,554,859 B1 | 4/2003 | Lang et al. |
| 6,557,992 B1 | 5/2003 | Dwyer et al. |
| 6,598,606 B2 | 7/2003 | Terwee et al. |
| 6,609,793 B2 | 8/2003 | Norrby et al. |
| 6,705,729 B2 | 3/2004 | Piers et al. |
| 6,709,102 B2 | 3/2004 | Duppstadt |
| 6,802,605 B2 | 10/2004 | Cox et al. |
| 6,808,262 B2 | 10/2004 | Chapoy et al. |
| 6,830,332 B2 | 12/2004 | Piers et al. |
| 6,846,326 B2 | 1/2005 | Zadno-Azizi et al. |
| 6,851,803 B2 | 2/2005 | Wooley et al. |
| 6,899,425 B2 | 5/2005 | Roffman et al. |
| 6,923,539 B2 | 8/2005 | Simpson et al. |
| 6,923,540 B2 | 8/2005 | Ye et al. |
| 6,986,578 B2 | 1/2006 | Jones |
| 7,036,931 B2 | 5/2006 | Lindacher et al. |
| 7,048,760 B2 | 5/2006 | Cumming |
| 7,061,693 B2 | 6/2006 | Zalevsky |
| 7,073,906 B1 | 7/2006 | Portney |
| 7,137,702 B2 | 11/2006 | Piers et al. |
| 7,156,516 B2 | 1/2007 | Morris et al. |
| 7,188,949 B2 | 3/2007 | Bandhauer et al. |
| 7,287,852 B2 | 10/2007 | Fiala |
| 7,293,873 B2 | 11/2007 | Dai et al. |
| 7,365,917 B2 | 4/2008 | Zalevsky |
| 7,377,640 B2 | 5/2008 | Piers et al. |
| 7,441,894 B2 | 10/2008 | Zhang et al. |
| 7,455,404 B2 | 11/2008 | Bandhauer et al. |

(56) References Cited

U.S. PATENT DOCUMENTS

| | | |
|---|---|---|
| 7,455,407 B2 | 11/2008 | Neal et al. |
| 7,475,986 B2 | 1/2009 | Dai et al. |
| 7,615,073 B2 | 11/2009 | Deacon et al. |
| 7,616,330 B2 | 11/2009 | Neal et al. |
| 7,713,299 B2 | 5/2010 | Brady et al. |
| 7,794,497 B2 | 9/2010 | Brady et al. |
| 7,857,451 B2 | 12/2010 | Thibos et al. |
| 7,871,162 B2 | 1/2011 | Weeber |
| 7,993,398 B2 | 8/2011 | Deacon et al. |
| 8,002,827 B2 | 8/2011 | Deacon et al. |
| 8,018,164 B2 | 9/2011 | Shannon et al. |
| 8,231,219 B2 | 7/2012 | Weeber |
| 8,241,354 B2 | 8/2012 | Hong et al. |
| 8,382,281 B2 | 2/2013 | Weeber |
| 8,430,508 B2 | 4/2013 | Weeber |
| 8,444,267 B2 | 5/2013 | Weeber et al. |
| 8,480,228 B2 | 7/2013 | Weeber |
| 8,573,775 B2 | 11/2013 | Weeber |
| 8,747,466 B2 | 6/2014 | Weeber et al. |
| 8,770,745 B2 | 7/2014 | Lindacher et al. |
| 8,862,447 B2 | 10/2014 | Weeber |
| 8,926,092 B2 | 1/2015 | Weeber |
| 9,216,080 B2 | 12/2015 | Bogaert et al. |
| 9,335,563 B2 | 5/2016 | Weeber |
| 9,557,580 B2 | 1/2017 | Weeber et al. |
| 9,581,834 B2 | 2/2017 | Weeber et al. |
| 9,987,127 B2 | 6/2018 | Bogaert et al. |
| 10,180,585 B2 | 1/2019 | Weeber et al. |
| 10,288,901 B2 | 5/2019 | Weeber |
| 2001/0035935 A1 | 11/2001 | Bhalakia et al. |
| 2001/0051825 A1 | 12/2001 | Peterson |
| 2002/0118337 A1 | 8/2002 | Perrott et al. |
| 2002/0173846 A1 | 11/2002 | Blake et al. |
| 2002/0196408 A1 | 12/2002 | Bhalakia et al. |
| 2002/0196412 A1 | 12/2002 | Abitbol |
| 2003/0076478 A1 | 4/2003 | Cox |
| 2003/0171808 A1 | 9/2003 | Phillips |
| 2004/0021824 A1 | 2/2004 | Ye et al. |
| 2004/0054358 A1 | 3/2004 | Cox et al. |
| 2004/0068317 A1 | 4/2004 | Knight |
| 2004/0080710 A1 | 4/2004 | Wooley et al. |
| 2004/0085515 A1 | 5/2004 | Roffman et al. |
| 2004/0106992 A1 | 6/2004 | Lang et al. |
| 2004/0111153 A1 | 6/2004 | Woods et al. |
| 2004/0150789 A1 | 8/2004 | Jones |
| 2004/0150790 A1 | 8/2004 | Roffman et al. |
| 2004/0156014 A1 | 8/2004 | Piers et al. |
| 2004/0167622 A1 | 8/2004 | Sunalp et al. |
| 2004/0230299 A1 | 11/2004 | Simpson et al. |
| 2005/0096226 A1 | 5/2005 | Stock et al. |
| 2005/0125056 A1 | 6/2005 | Deacon et al. |
| 2005/0128432 A1 | 6/2005 | Altmann |
| 2005/0203619 A1 | 9/2005 | Altmann |
| 2005/0251254 A1 | 11/2005 | Brady et al. |
| 2005/0267575 A1 | 12/2005 | Nguyen et al. |
| 2006/0009816 A1 | 1/2006 | Fang et al. |
| 2006/0030938 A1 | 2/2006 | Altmann |
| 2006/0034003 A1 | 2/2006 | Zalevsky |
| 2006/0055883 A1 | 3/2006 | Morris et al. |
| 2006/0066808 A1 | 3/2006 | Blum et al. |
| 2006/0068453 A1 | 3/2006 | Altieri |
| 2006/0098162 A1 | 5/2006 | Bandhauer et al. |
| 2006/0098163 A1 | 5/2006 | Bandhauer et al. |
| 2006/0109421 A1 | 5/2006 | Ye et al. |
| 2006/0116763 A1 | 6/2006 | Simpson |
| 2006/0116764 A1 | 6/2006 | Simpson |
| 2006/0116765 A1 | 6/2006 | Blake et al. |
| 2006/0176572 A1 | 8/2006 | Fiala |
| 2006/0238702 A1 | 10/2006 | Glick et al. |
| 2006/0244904 A1 | 11/2006 | Hong et al. |
| 2006/0244916 A1 | 11/2006 | Guillon |
| 2006/0279700 A1 | 12/2006 | Liang |
| 2007/0052920 A1 | 3/2007 | Stewart et al. |
| 2007/0129803 A1 | 6/2007 | Cumming et al. |
| 2007/0171362 A1 | 7/2007 | Simpson et al. |
| 2007/0182924 A1 | 8/2007 | Hong et al. |
| 2007/0236769 A1 | 10/2007 | Zalevsky |
| 2007/0268453 A1 | 11/2007 | Hong et al. |
| 2008/0018910 A1 | 1/2008 | Neal et al. |
| 2008/0030677 A1 | 2/2008 | Simpson |
| 2008/0161913 A1 | 7/2008 | Brady et al. |
| 2008/0161914 A1 | 7/2008 | Brady et al. |
| 2008/0231809 A1 | 9/2008 | Haigis |
| 2008/0269642 A1 | 10/2008 | Deacon et al. |
| 2008/0273169 A1 | 11/2008 | Blum et al. |
| 2008/0291393 A1 | 11/2008 | Menezes |
| 2009/0012609 A1 | 1/2009 | Geraghty et al. |
| 2009/0036980 A1 | 2/2009 | Norrby et al. |
| 2009/0051876 A1 | 2/2009 | Seiler et al. |
| 2009/0062911 A1 | 3/2009 | Bogaert |
| 2009/0088840 A1 | 4/2009 | Simpson et al. |
| 2009/0164008 A1 | 6/2009 | Hong et al. |
| 2009/0187242 A1 | 7/2009 | Weeber et al. |
| 2009/0210054 A1 | 8/2009 | Weeber et al. |
| 2009/0234448 A1 | 9/2009 | Weeber et al. |
| 2009/0268155 A1 | 10/2009 | Weeber |
| 2009/0268158 A1 | 10/2009 | Weeber |
| 2009/0279048 A1 | 11/2009 | Hong et al. |
| 2009/0295295 A1 | 12/2009 | Shannon et al. |
| 2009/0323020 A1 | 12/2009 | Zhao et al. |
| 2010/0016961 A1 | 1/2010 | Hong et al. |
| 2010/0016965 A1 | 1/2010 | Hong et al. |
| 2010/0082017 A1 | 4/2010 | Zickler et al. |
| 2010/0100178 A1 | 4/2010 | Weeber et al. |
| 2010/0130888 A1 | 5/2010 | Deacon et al. |
| 2010/0161048 A1 | 6/2010 | Schaper, Jr. |
| 2010/0274234 A1 | 10/2010 | Liang |
| 2011/0149236 A1 | 6/2011 | Weeber |
| 2011/0166652 A1 | 7/2011 | Bogaert et al. |
| 2011/0267693 A1 | 11/2011 | Kobayashi et al. |
| 2011/0270596 A1 | 11/2011 | Weeber |
| 2012/0140166 A1 | 6/2012 | Zhao |
| 2012/0320334 A1 | 12/2012 | Ho et al. |
| 2013/0293836 A1 | 11/2013 | Weeber |
| 2018/0256317 A1 | 9/2018 | Bogaert et al. |
| 2019/0004331 A1 | 1/2019 | Weeber et al. |
| 2021/0294123 A1 | 9/2021 | Weeber et al. |
| 2022/0113557 A1 | 4/2022 | Hong |
| 2023/0172705 A1 | 6/2023 | Alarcon Heredia et al. |
| 2024/0348702 A1 | 10/2024 | Agrawal et al. |

FOREIGN PATENT DOCUMENTS

| | | |
|---|---|---|
| CN | 1039487 A | 2/1990 |
| CN | 1406120 A | 3/2003 |
| CN | 1833192 A | 9/2006 |
| DE | 8107675 U1 | 7/1981 |
| EP | 226400 A2 | 6/1987 |
| EP | 227357 A2 | 7/1987 |
| EP | 0317168 A2 | 5/1989 |
| EP | 0343067 A1 | 11/1989 |
| EP | 0457553 A2 | 11/1991 |
| EP | 0458508 A2 | 11/1991 |
| EP | 681198 A1 | 11/1995 |
| EP | 0926531 A1 | 6/1999 |
| EP | 949529 A2 | 10/1999 |
| EP | 957331 A2 | 11/1999 |
| EP | 1424049 A1 | 6/2004 |
| EP | 1310267 B1 | 1/2008 |
| EP | 1424049 B1 | 6/2009 |
| EP | 2182891 B1 | 4/2014 |
| EP | 3179294 A1 | 6/2017 |
| FR | 2745711 A1 | 9/1997 |
| JP | H0255314 A | 2/1990 |
| JP | H11142614 A | 5/1999 |
| WO | 8603961 A1 | 7/1986 |
| WO | 9222264 A1 | 12/1992 |
| WO | 9303409 A1 | 2/1993 |
| WO | 9507487 A1 | 3/1995 |
| WO | 9856315 A1 | 12/1998 |
| WO | 0019906 A1 | 4/2000 |
| WO | 0111418 A1 | 2/2001 |
| WO | 0135868 A1 | 5/2001 |
| WO | 0154569 A1 | 8/2001 |

(56) References Cited

FOREIGN PATENT DOCUMENTS

| WO | 0163344 | A1 | 8/2001 |
|---|---|---|---|
| WO | 0182839 | A1 | 11/2001 |
| WO | 0189424 | A1 | 11/2001 |
| WO | 0221194 | A2 | 3/2002 |
| WO | 03009053 | A1 | 1/2003 |
| WO | 2004034129 | A1 | 4/2004 |
| WO | 2004090611 | A2 | 10/2004 |
| WO | 2004096014 | A2 | 11/2004 |
| WO | 05019906 | A1 | 3/2005 |
| WO | 06025726 | A1 | 3/2006 |
| WO | 2006032263 | A2 | 3/2006 |
| WO | 2006047698 | A1 | 5/2006 |
| WO | 06060477 | A2 | 6/2006 |
| WO | 2006060480 | A2 | 6/2006 |
| WO | 2007067872 | A2 | 6/2007 |
| WO | 2007092948 | A1 | 8/2007 |
| WO | 2007133384 | A2 | 11/2007 |
| WO | 2008045847 | A2 | 4/2008 |
| WO | 2008083283 | A2 | 7/2008 |
| WO | 2009020963 | A1 | 2/2009 |
| WO | 2009029515 | A1 | 3/2009 |
| WO | 2009058755 | A1 | 5/2009 |
| WO | 2009076670 | A1 | 6/2009 |
| WO | 2009137491 | A1 | 11/2009 |
| WO | 2010009254 | A1 | 1/2010 |
| WO | 2010009257 | A1 | 1/2010 |

OTHER PUBLICATIONS

International Preliminary Report on Patentability, received for PCT Application No. PCT/US2008/073999, mailed on Mar. 2, 2010, 9 pages.
International Preliminary Report on Patentability, received for PCT Application No. PCT/US2009/042449, mailed on Nov. 17, 2010, 13 pages.
Extended European Search Report, received for European Application No. 20202865.0, mailed on Apr. 28, 2021, 7 pages.
Extended European Search Report, received for European Application No. 24206059.8, mailed on Nov. 4, 2024, 8 pages.
Extended European Search Report, received for European Application No. 21200091.3, mailed on Jan. 13, 2022, 7 pages.
International Preliminary Report on Patentability, received for Application No. PCT/EP2008/061235, mailed on Mar. 2, 2010, 7 pages.
International Preliminary Report on Patentability, received for PCT Application No. PCT/EP2009/051783, mailed on Jun. 8, 2010, 6 pages.
International Preliminary Report on Patentability, received for PCT Application No. PCT/IB2009/005590, mailed on Sep. 6, 2011, 11 pages.
International Preliminary Report on Patentability, received for PCT Application No. PCT/US2008/061180, mailed on Oct. 27, 2009, 8 pages.
International Preliminary Report on Patentability, received for PCT Application No. PCT/US2009/038469, mailed on Sep. 28, 2010, 10 pages.
International Search Report and Written Opinion, received for PCT Application No. PCT/EP2008/061235, mailed on Mar. 5, 2009, 8 pages.
International Search Report and Written Opinion, received for PCT Application No. PCT/EP2009/051783, mailed on Apr. 28, 2009, 11 pages.
International Search Report and Written Opinion, received for PCT Application No. PCT/EP2022/084231, mailed on Mar. 21, 2023, 14 pages.
International Search Report and Written Opinion, received for PCT Application No. PCT/IB2009/005590, mailed on Sep. 30, 2009, 14 pages.
International Search Report and Written Opinion, received for PCT Application No. PCT/IB2011/001067, mailed on Sep. 13, 2011, 13 pages.
International Search Report and Written Opinion, received for PCT Application No. PCT/US2008/073999, mailed on Dec. 3, 2008, 11 pages.
International Search Report and Written Opinion, received for PCT Application No. PCT/US2009/034555, mailed on May 18, 2009, 13 pages.
International Search Report and Written Opinion, received for PCT Application No. PCT/US2009/038469, mailed on Aug. 10, 2009, 14 pages.
International Search Report and Written Opinion, received for PCT Application No. PCT/US2009/042449, mailed on Nov. 5, 2009, 18 pages.
International Search Report and Written Opinion, received for PCT Application No. PCT/US2010/038167, mailed on Sep. 27, 2010, 9 pages.
International Search Report and Written Opinion, received for PCT Application No. PCT/US2010/061017, mailed on Jun. 16, 2011, 15 pages.
International Search Report and Written Opinion, received for PCT Application No. PCT/US2010/061042, mailed on Mar. 31, 2011, 11 pages.
International Search Report and Written Opinion, received for PCT Application No. PCT/US2010/061081, mailed on Apr. 6, 2011, 16 pages.
International Search Report and Written Opinion, received for PCT Application No. PCT/US2011/026193, mailed on Jun. 7, 2011, 16 pages.
International Search Report and Written Opinion, received for PCT Application No. PCT/US2008/061180, mailed on Sep. 5, 2008, 10 pages.
International Search Report and Written Opinion, received for PCT Application No. PCT/US2011/043119, mailed on Feb. 15, 2012, 15 pages.
US Unpublished Patent, U.S. Appl. No. 61/047,699, filed Apr. 24, 2008, 19 pages.
Alfonso J.F., et al., "Prospective Study of the Acri.LISA Bifocal Intraocular Lens," Journal of Cataract Refractive Surgery, Nov. 2007, vol. 33 (11), pp. 1930-1935.
Alio J.L., et al., "Phakic Anterior Chamber Lenses for the Correction of Myopia: A 7-Year Cumulative Analysis of Complications in 263 Cases," Ophthalmology, Mar. 1999, vol. 106 (3), pp. 458-466.
Apple D.J., et al., "Anterior Chamber Lenses Part 1: Complications and Pathology and a Review of Designs," Journal of Cataract Refractive Surgery, Mar. 1987, vol. 13 (2), pp. 157-174.
Apple D.J., et al., Eds., "Intraocular Lenses: Evolution, Designs, Complications and Pathology," in: New Concepts in Intraocular Lens Implantation, Williams Wilkins publisher, Jan. 1989, vol. 36 (1), pp. 21-36.
Apple D.J., et al., "Intraocular Lenses: Evolution, Designs, Complications and Pathology," New Concepts in Intraocular Lens Implantation, Williams & Wilkins publisher, Jan. 1989, vol. 22 (36), pp. 205-221.
Baikoff G., et al., "Angle-fixated Anterior Chamber Phakic Intraocular Lens for Myopia 7 to -19 Diopters," Journal of Refractive Surgery, May-Jun. 1998, vol. 14 (3), pp. 282-292.
Canovas C., et al., "Hybrid Adaptive-Optics Visual Simulator," Optical Letters, Jan. 15, 2010, vol. 35 (2), pp. 196-198.
Cheng X., et al., "Predicting Subjective Judgment of Best Focus with Objective Image Quality Metrics," Journal of Vision, Apr. 2004, vol. 4 (4), pp. 310-321.
CILCO Advertisement Brochure, Oct. 1982, 3 pages.
Cohen A.L., "Practical Design of a Bifocal Hologram Contact Lens or Intraocular Lens," Applied Optics, Jul. 1, 1992, vol. 31 (19), pp. 3750-3754.
De Almeida M.S., et al., "Different Schematic Eyes and their Accuracy to the in Vivo Eye: A Quantitative Comparison Study," Brazilian Journal of Physics, Jun. 2007, vol. 37 (2A), 10 pages.
Diffractive Lenses for Extended Depth of Focus and Presbyopic Correction, Presentation from Wavefront Congress held on Feb. 15, 2008, Rochester, New York.
Doskolovich L.L., et al., "Special Diffractive Lenses," Lens and Optical Systems Design, Apr. 1992, vol. 1780, pp. 393-402.

(56) References Cited

OTHER PUBLICATIONS

European Search Report for Application No. EP11165087, mailed on Jul. 22, 2011, 6 pages.
European Search Report for Application No. EP89304883, mailed on Sep. 3, 1990, 1 page.
Kim J.H., et al., "The Analysis of Predicted Capsular Bag Diameter using Modified Model of Capsule Measuring Ring in Asians," Clinical and Experimental Ophthalmology, Apr. 2008, vol. 36 (3), pp. 238-244.
Liou H.L., et al., "Anatomically Accurate, Finite Model Eye for Optical Modeling," Journal of Optical Society of America, Aug. 1997, vol. 14 (8), pp. 1684-1695.
Liou H.L., et al., "The Prediction of Spherical Aberration with Schematic Eyes," Ophthalmic and Physiological Optics, Jan. 1996, vol. 16 (4), pp. 348-354.
Marinho A., "Results are Encouraging for Phakic IOLs, but More Work is needed," Refractive Surgery, Feb. 2000, p. 12, 15.
Marsack J.D., et al., "Metrics of Optical Quality Derived from Wave Aberrations Predict Visual Performance," Journal of Vision, Apr. 2004, vol. 4 (4), pp. 322-328.
Menapace R., "The Capsular Tension Rings," Journal of Cataract Refractive Surgery, Dec. 10, 2008, Chap. 3, pp. 27-44.
Monsoriu J.A., et al., "Devil's Lenses," Optics Express, Oct. 17, 2007, vol. 15 (21), pp. 13858-13864.
Morlock, R., et al., "Patient-Reported Spectacle Independence Questionnaire (PRSIQ): Development and Validation," American Journal of Ophthalmology, Jun. 2017, vol. 178, pp. 101-114.
Navarro R., et al., "Accommodation-Dependent Model of the Human Eye with Aspherics," Journal of the Optical Society of America, Aug. 1985, vol. 2 (8), pp. 1273-1281.
Nio Y.K., et al., "Effect of Intraocular Lens Implantation on Visual Acuity, Contrast Sensitivity, and Depth of Focus," Journal of Cataract and Refractive Surgery, Nov. 2003, vol. 29 (11), pp. 2073-2081.
Norrby S., et al., "Model Eyes for Evaluation of Intraocular Lenses," Applied Optics, Sep. 7, 2007, vol. 46 (26), pp. 6595-6605.
Olsen T., "Simple Method to Calculate the Surgically Induced Refractive Change," Journal of Cataract Refractive Surgery, Mar. 1993, vol. 19 (2), pp. 319-320.
Piers P. A., et al., "Eye Models for the Prediction of Contrast Vision in Patients with New Intraocular Lens Designs," Optics Letters, Apr. 1, 2004, vol. 29 (7), pp. 733-735.
Piers P. A., et al., "Theoretical Comparison of Aberration-Correcting Customized and Aspheric Intraocular Lenses," Journal of Refractive Surgery, Apr. 2007, vol. 23 (4), pp. 374-384.
Praeger D.L., "Praeger Technique for the Insertion of the Copeland Radial IOL Posterior Chamber Placement," Copeland Lens, 1982, 7 pages.
Siedlecki D., et al., "Radial Gradient index Intraocular Lens: a Theoretical Model," Journal of Modern Optics, 20 February - Mar. 10, 2008, vol. 55 (4-5), pp. 639-647.
Strenn K., et al., "Capsular bag Shrinkage after Implantation of an Open-Loop Silicone Lens and a Poly(methyl methacrylate) Capsule Tension Ring," Journal of Cataract and Refractive Surgery, Dec. 1997, vol. 23 (10), pp. 1543-1547.
Tehrani M., et al., "Capsule Measuring Ring to Predict Capsular Bag Diameter and Follow its Course after Foldable Intraocular Lens Implantation," Journal of Cataract Refractive Surgery, Nov. 2003, vol. 29 (11), pp. 2127-2134.
Terwee T., et al., "Visualization of the Retinal Image in an Eye Model With Spherical and Aspheric, Diffractive, and Refractive Multifocal Intraocular Lenses," Journal of Refractive Surgery, Mar. 2008, vol. 24 (3), pp. 223-232.
Van Den Berg T.J., "Analysis of Intraocular Straylight, Especially in Relation to Age," Optometry and Vision Science, Feb. 1995, vol. 72 (2), pp. 52-59.
Van Meeteren A., "Calculations on the Optical Modulation Transfer Function of the Human Eye for White Light," Optica Acta, May 1974, vol. 21 (5), pp. 395-412.
Vass C., et al., "Prediction of Pseudophakic Capsular bag Diameter based on Biometric Variables," Journal of Cataract and Refractive Surgery, Oct. 1999, vol. 25 (10), pp. 1376-1381.
Venter, J.A., et al., "Visual Outcomes and Patient Satisfaction with a Rotational Asymmetric Refractive Intraocular Lens for Emmetropic Presbyopia," Cataract Refractive Surgery, Mar. 2015, vol. 41 (3), pp. 585-593.
Villegas E.A., et al., "Correlation between Optical and Psychophy, Sical Parameters as a Function of Defocus," Optometry and Vision Science, Jan. 1, 2002, vol. 79 (1), pp. 60-67.

LENSES HAVING MULTI-RING DESIGN FOR VISION TREATMENT

CROSS REFERENCE TO RELATED APPLICATIONS

This application claims the benefit under 35 U.S.C. § 119(e) of U.S. Provisional Application No. 63/264,938, filed Dec. 3, 2021, the contents of which are incorporated by reference as if fully set forth.

BACKGROUND

Embodiments of the present disclosure relate to vision treatment techniques and in particular, to ophthalmic lenses such as, for example, contact lenses, corneal inlays or onlays, or intraocular lenses (IOLs) including, for example, phakic IOLs and piggyback IOLs (i.e. IOLs implanted in an eye already having an IOL).

Presbyopia is a condition that affects the accommodation properties of the eye. As objects move closer to a young, properly functioning eye, the effects of ciliary muscle contraction and zonular relaxation allow the lens of the eye to change shape, and thus increase its optical power and ability to focus at near distances. This accommodation can allow the eye to focus and refocus between near and far objects.

Presbyopia normally develops as a person ages and is associated with a natural progressive loss of accommodation. The presbyopic eye often loses the ability to rapidly and easily refocus on objects at varying distances. The effects of presbyopia usually become noticeable after the age of 45 years. By the age of 65 years, the crystalline lens has often lost almost all elastic properties and has only a limited ability to change shape.

Along with reductions in accommodation of the eye, age may also induce clouding of the lens due to the formation of a cataract. A cataract may form in the hard central nucleus of the lens, in the softer peripheral cortical portion of the lens, or at the back of the lens. Cataracts can be treated by the replacement of the cloudy natural lens with an artificial lens. An artificial lens replaces the natural lens in the eye, with the artificial lens often being referred to as an intraocular lens or "IOL."

Monofocal IOLs are intended to provide vision correction at one distance only, usually the far focus. At the very least, since a monofocal IOL provides vision treatment at only one distance and since the typical correction is for far distance, spectacles are usually needed for good vision at near distances and sometimes for good vision at intermediate distances. The term "near vision" generally corresponds to vision provided when objects are at a distance from the subject eye at equal; or less than 1.5 feet. The term "distant vision" generally corresponds to vision provided when objects are at a distance of at least about 5-6 feet or greater. The term "intermediate vision" corresponds to vision provided when objects are at a distance of about 1.5 feet to about 5-6 feet from the subject eye. Such characterizations of near, intermediate, and far vision correspond to those addressed in Morlock R, Wirth R J, Tally S R, Garufis C, Heichel CWD, Patient-Reported Spectacle Independence Questionnaire (PRSIQ): Development and Validation. Am J Ophthalmology 2017; 178:101-114.

There have been various attempts to address limitations associated with monofocal IOLs. For example, multifocal IOLs have been proposed that deliver, in principle, two foci, one near and one far, optionally with some degree of intermediate focus. Such multifocal, or bifocal, IOLs are intended to provide good vision at two distances, and include both refractive and diffractive multifocal IOLs. In some instances, a multifocal IOL intended to correct vision at two distances may provide a near (add) power of about 3.0 or 4.0 diopters.

Multifocal IOLs may, for example, rely on a diffractive optical surface to direct portions of the light energy toward differing focal distances, thereby allowing the patient to clearly see both near and far objects. Multifocal ophthalmic lenses (including contact lenses or the like) have also been proposed for treatment of presbyopia without removal of the natural crystalline lens. Diffractive optical surfaces, either monofocal or multifocal, may also be configured to provide reduced chromatic aberration.

Diffractive monofocal and multifocal lenses can make use of a material having a given refractive index and a surface curvature which provide a refractive power. Diffractive lenses have a diffractive profile which confers the lens with a diffractive power that contributes to the overall optical power of the lens. The diffractive profile is typically characterized by a number of diffractive zones. When used for ophthalmic lenses these zones are typically annular lens zones, or echelettes, spaced about the optical axis of the lens. Each echelette may be defined by an optical zone, a transition zone between the optical zone and an optical zone of an adjacent echelette, and an echelette geometry. The echelette geometry includes an inner and outer diameter and a shape or slope of the optical zone, a height or step height, and a shape of the transition zone. The surface area or diameter of the echelettes largely determines the diffractive power(s) of the lens and the step height of the transition between echelettes largely determines the light distribution between the different powers. Together, these echelettes form a diffractive profile.

A multifocal diffractive profile of the lens may be used to mitigate presbyopia by providing two or more optical powers; for example, one for near vision and one for far vision. The lenses may also take the form of an intraocular lens placed within the capsular bag of the eye, replacing the original lens, or placed in front of the natural crystalline lens. The lenses may also be in the form of a contact lens, most commonly a bifocal contact lens, or in any other form mentioned herein.

Although multifocal ophthalmic lenses lead to improved quality of vision for many patients, additional improvements would be beneficial. For example, some pseudophakic patients experience undesirable visual effects (dysphotopsia), e.g. glare or halos. Halos may arise when light from the unused focal image creates an out-of-focus image that is superimposed on the used focal image. For example, if light from a distant point source is imaged onto the retina by the distant focus of a bifocal IOL, the near focus of the IOL will simultaneously superimpose a defocused image on top of the image formed by the distant focus. This defocused image may manifest itself in the form of a ring of light surrounding the in-focus image, and is referred to as a halo. Another area of improvement revolves around the typical bifocality of multifocal lenses. While multifocal ophthalmic lenses typically provide adequate near and far vision, intermediate vision may be compromised.

A lens with an extended range of vision may thus provide certain patients the benefits of good vision at a range of distances, while having reduced or no dysphotopsia. Various techniques for extending the depth of focus of an IOL have been proposed. One technique is embodied in the Tecnis Symfony® lens offered by Johnson & Johnson Vision. One technique may include a bulls-eye refractive principle, and may involve a central zone with a slightly increased power. One technique may include an asphere or include refractive zones with different refractive zonal powers.

Although certain proposed treatments may provide some benefit to patients in need thereof, further advances would be desirable. For example, it would be desirable to provide improved IOL systems and methods that confer enhanced image quality across a wide and extended range of foci without dysphotopsia. Further, improved IOL systems and methods to reduce visual symptoms produced by transition zones of diffractive profiles such as halo, glare, and scatter, may be desired. Embodiments of the present disclosure may provide solutions that address the problems described above, and hence may provide answers to at least some of these outstanding needs.

BRIEF SUMMARY

Embodiments herein described include ophthalmic lenses including an optic. The optic may include a diffractive profile including an interior echelette having a step height of no more than 0.2 wavelengths and an outer echelette having a step height of more than 0.2 wavelengths and less than two wavelengths. The width of the interior echelette may correspond to a power between 1 and 5 diopters. It is also envisioned that the interior echelette may have a width of about 0.5 millimeters. The width of the outer echelette may correspond to a power between 1 and 5 diopters. It may also have a width of about 0.5 millimeters. The width of the interior echelette in r-squared space may be the same or different as a width of the outer echelette in r-squared space.

The optic may include a central zone with the interior echelette positioned at the central zone. The interior echelette may be positioned at an optical axis of the optic. The outer echelette may be adjacent to the interior echelette. The optic may further include a refractive zone extending radially outward from the outer echelette and adjacent to the outer echelette.

The diffractive profile may include no more echelettes than the interior echelette and the outer echelette. The interior echelette may have a step height of zero or greater. The outer echelette may have a step offset. The optic may include a refractive zone positioned outside of the outer echelette and having a step offset.

Embodiments herein described include a method comprising fabricating an optic for an ophthalmic lens, the optic including a diffractive profile including an interior echelette having a step height of no more than 0.2 wavelengths and an outer echelette having a step height of more than 0.2 wavelengths and less than two wavelengths.

The method may further include receiving an ophthalmic lens prescription, and fabricating the optic based on the ophthalmic lens prescription. The method may further include determining one or more of the diffractive profile or a refractive profile of the optic based on the ophthalmic lens prescription.

The method may further include an optic where the interior echelette is positioned at a central zone, and may further include the interior echelette positioned at an optical axis of the optic. The method also envisions the outer echelette adjacent to the interior echelette.

Embodiments herein described include a system for fabricating an ophthalmic lens. The system may include a processor configured to determine a diffractive profile of an optic, the diffractive profile including an interior echelette having a step height of no more than 0.2 wavelengths and an outer echelette having a step height of more than 0.2 wavelengths and less than two wavelengths. The system may include a manufacturing assembly that fabricates the optic based on the diffractive profile.

The system may further include an input for receiving an ophthalmic lens prescription, and wherein the processor is configured to determine one or more of the diffractive profile or a refractive profile of the optic based on the ophthalmic lens prescription.

The system may further include an optic where the interior echelette is positioned at a central zone, and may further include the interior echelette positioned at an optical axis of the optic. The system also envisions the outer echelette adjacent to the interior echelette.

DETAILED DESCRIPTION

FIGS. 1A, 1B, 2A, 2B, 3A and 3B illustrate multifocal IOL lens geometries, aspects of which are described in U.S.

Patent Publication No. 2011-0149236 A1, which is hereby incorporated by reference in its entirety.

Figure 1A:
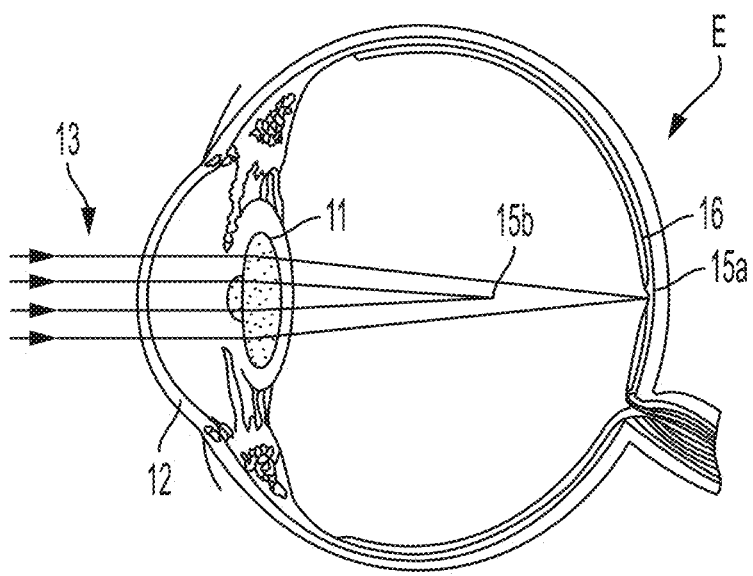
FIG. 1A illustrates a cross-sectional view of an eye with an implanted multifocal refractive intraocular lens.

FIG. 1A is a cross-sectional view of an eye E fit with a multifocal IOL 11. As shown, multifocal IOL 11 may, for example, comprise a bifocal IOL. Multifocal IOL 11 receives light from at least a portion of cornea 12 at the front of eye E and is generally centered about the optical axis of eye E. For ease of reference and clarity, FIGS. 1A and 1B do not disclose the refractive properties of other parts of the eye, such as the corneal surfaces. Only the refractive and/or diffractive properties of the multifocal IOL 11 are illustrated.

Each major face of lens 11, including the anterior (front) surface and posterior (back) surface, generally has a refractive profile, e.g. biconvex, plano-convex, plano-concave, meniscus, etc. The two surfaces together, in relation to the properties of the surrounding aqueous humor, cornea, and other optical components of the overall optical system, define the effects of the lens 11 on the imaging performance by eye E. Conventional, monofocal IOLs have a refractive power based on the refractive index of the material from which the lens is made, and also on the curvature or shape of the front and rear surfaces or faces of the lens. One or more support elements may be configured to secure the lens 11 to a patient's eye.

Multifocal lenses may optionally also make special use of the refractive properties of the lens. Such lenses generally include different powers in different regions of the lens so as to mitigate the effects of presbyopia. For example, as shown in FIG. 1A, a perimeter region of refractive multifocal lens 11 may have a power which is suitable for viewing at far viewing distances. The same refractive multifocal lens 11 may also include an inner region having a higher surface curvature and a generally higher overall power (sometimes referred to as a positive add power) suitable for viewing at near distances.

Figure 1B:
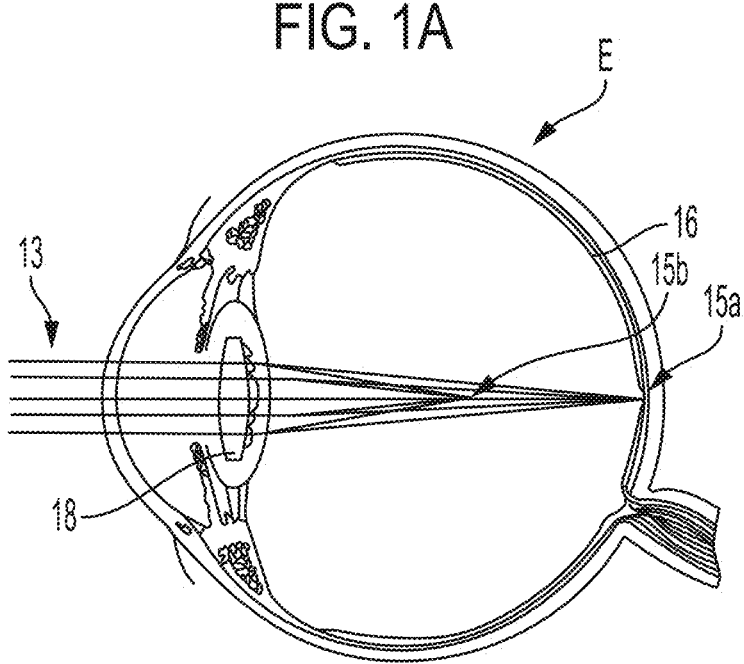
FIG. 1B illustrates a cross-sectional view of an eye having an implanted multifocal diffractive intraocular lens.

Rather than relying entirely on the refractive properties of the lens, multifocal diffractive IOLs or contact lenses can also have a diffractive power, as illustrated by the IOL 18 shown in FIG. 1B. The diffractive power can, for example, comprise positive or negative power, and that diffractive power may be a significant (or even the primary) contributor to the overall optical power of the lens. The diffractive power is conferred by a plurality of concentric diffractive zones which form a diffractive profile. The diffractive profile may either be imposed on the anterior face or posterior face or both.

The diffractive profile of a diffractive multifocal lens directs incoming light into a number of diffraction orders. As light 13 enters from the front of the eye, the multifocal lens 18 directs light 13 to form a far field focus 15a on retina 16 for viewing distant objects and a near field focus 15b for viewing objects close to the eye. Depending on the distance from the source of light 13, the focus on retina 16 may be the near field focus 15b instead. Typically, far field focus 15a is associated with $0^{th}$ diffractive order and near field focus 15b is associated with the $1^{st}$ diffractive order, although other orders may be used as well.

Bifocal ophthalmic lens 18 typically distributes the majority of light energy into two viewing orders, often with the goal of splitting imaging light energy about evenly (50%: 50%), one viewing order corresponding to far vision and one viewing order corresponding to near vision, although typically, some fraction goes to non-viewing orders.

Corrective optics may be provided by phakic IOLs, which can be used to treat patients while leaving the natural lens in place. Phakic IOLs may be angle supported, iris supported, or sulcus supported. The phakic IOL can be placed over the natural crystalline lens or piggy-backed over another IOL. It is also envisioned that the present disclosure may be applied to inlays, onlays, accommodating IOLs, pseudophakic IOLs, other forms of intraocular implants, spectacles, and even laser vision correction.

Figure 2A:
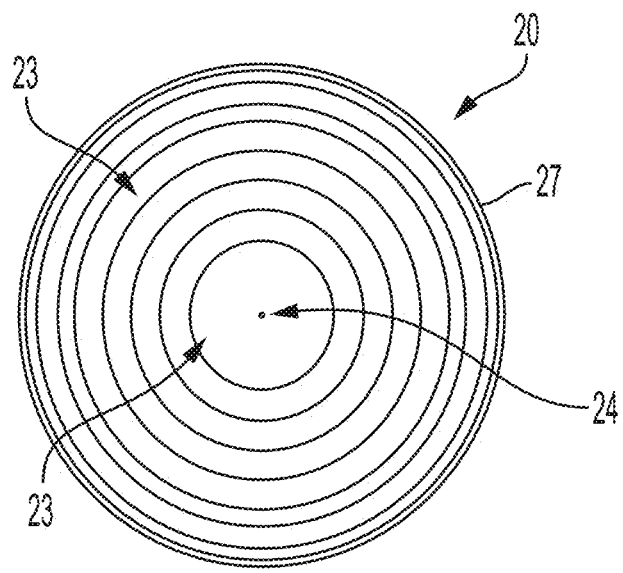
FIG. 2A illustrates a front view of a diffractive multifocal intraocular lens.
Figure 2B:
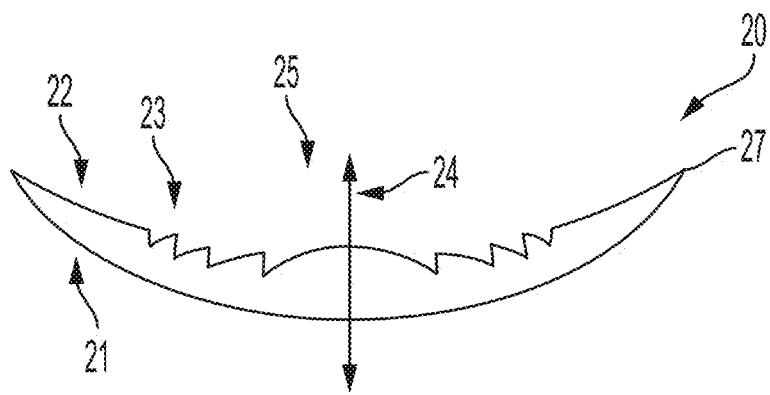
FIG. 2B illustrates a cross-sectional view of a diffractive multifocal intraocular lens.

FIGS. 2A and 2B show aspects of a conventional diffractive multifocal lens 20. Multifocal lens 20 may have certain optical properties that are generally similar to those of multifocal IOLs 11, 18 described above. Multifocal lens 20 has an anterior lens face 21 and a posterior lens face 22 disposed about an optical axis 24. The faces 21, 22, or optical surfaces, extend radially outward from the optical axis 24 to an outer periphery 27 of the optic. The optic may include a central zone 25 that the optical axis 24 passes through. The faces 21, 22, or optical surfaces, face opposite each other.

When fitted onto the eye of a subject or patient, the optical axis of lens 20 is generally aligned with the optical axis of eye E. The curvature of lens 20 gives lens 20 an anterior refractive profile and a posterior refractive profile. Although a diffractive profile may also be imposed on either anterior face 21 and posterior face 22 or both, FIG. 2B shows posterior face 22 with a diffractive profile. The diffractive profile is characterized by a plurality of annular diffractive zones or echelettes 23 spaced about optical axis 24. While analytical optics theory generally assumes an infinite number of echelettes, a standard multifocal diffractive IOL typically has at least 9 echelettes, and may have over 30 echelettes. For the sake of clarity, FIG. 2B shows only 4 echelettes. Typically, an IOL is biconvex, or possibly plano-convex, or convex-concave, although an IOL could be plano-plano, or other refractive surface combinations.

Figure 3A:
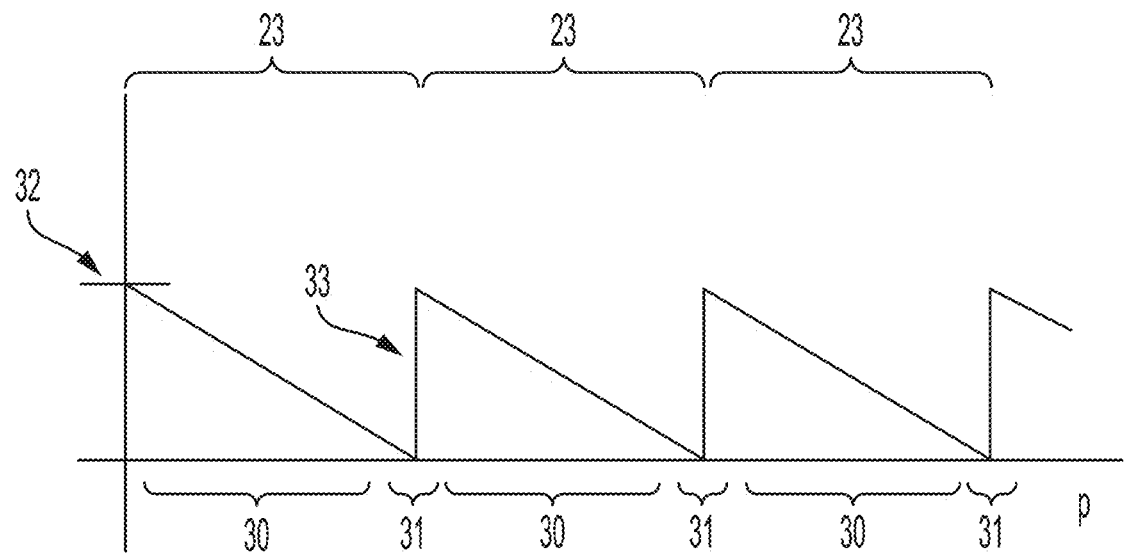
FIGS. 3A-3B are graphical representations of a portion of the diffractive profile of a conventional diffractive multifocal lens.
Figure 3B:
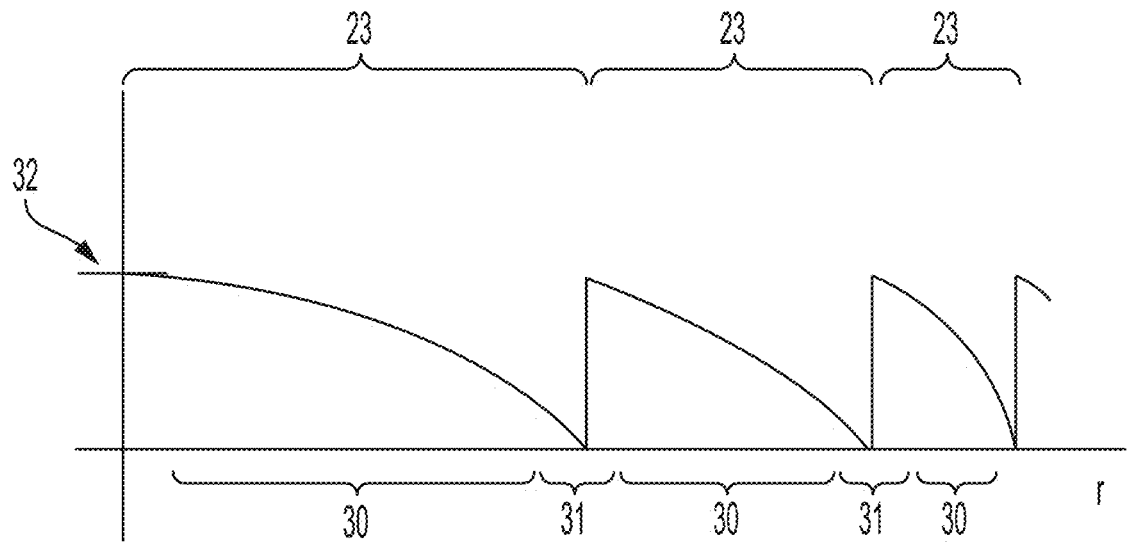

FIGS. 3A and 3B are graphical representations of a portion of a typical diffractive profile of a multifocal lens. While the graph shows only 3 echelettes, typical diffractive lenses extend to at least 9 echelettes to over 32 echelettes. In FIG. 3A, the height 32 of the surface relief profile (from a plane perpendicular to the light rays) of each point on the echelette surface is plotted against the square of the radial distance ($r^2$ or $\rho$) from the optical axis of the lens (referred to as r-squared space). In multifocal lenses, each echelette 23 may have a diameter or distance from the optical axis which is often proportional to Ain, n being the number of the echelette 23 as counted from optical axis 24. Each echelette has a characteristic optical zone 30 and transition zone 31. Optical zone 30 typically has a shape or downward slope that is parabolic as shown in FIG. 3B. The slope of each echelette in r-squared space (shown in FIG. 3A), however, is the same. As for the typical diffractive multifocal lens, as shown here, all echelettes have the same surface area. The area of echelettes 23 determines the diffractive power of lens 20, and, as area and radii are correlated, the diffractive power is also related to the radii of the echelettes. The physical offset of the trailing edge of each echelette to the leading edge of the adjacent echelette is the step height. An exemplary step height between adjacent echelettes is marked as reference number 33 in FIG. 3A. The step heights remain the same in r-squared space (FIG. 3A) and in linear space (FIG. 3B). The step offset is the height offset of the transition zone from the underlying base curve. An exemplary step offset is marked as reference number 1200 in FIG. 12.

A factor contributing to visual symptoms in diffractive lenses are the transition zones between the echelettes. The width of the transition zone may not occur sharply as a single step but may have a gradual transition. For example, the width may be caused by the radius of the manufacturing tool utilized to create the profile. A larger width of a transition zone may result in greater adverse visual symptoms, including halo, glare, and scatter.

Figure 4:
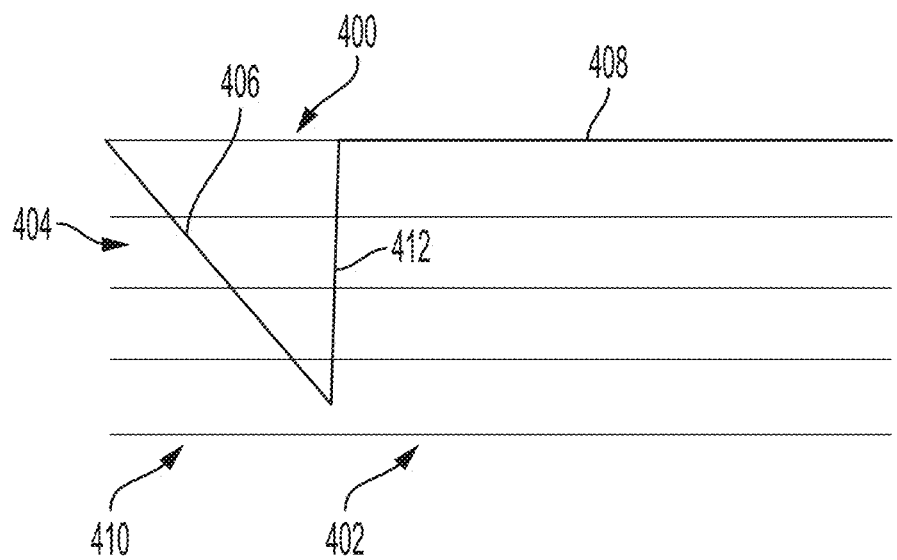
FIG. 4 illustrates a diffractive profile of a single ring optic.

Diffractive intraocular lenses may be provided that include a single ring to reduce adverse visual symptoms. Such an embodiment is shown, for example, in FIG. 4, illustrating a diffractive profile 400 with distance from an optical axis shown on the X-axis 402, and a height of the profile shown on the Y-axis 404. The profile may include a single echelette 406, that may be positioned at a central zone 410 of the optic and may have a step height 412. The single echelette 406 may be surrounded by a refractive zone 408 positioned in a peripheral zone of the optic.

Such a configuration of a diffractive profile shown in FIG. 4 may reduce visual symptoms, such as halo, glare, and scatter, and may provide good distance image quality for average pupil sizes (e.g., ≥3 millimeter pupil size). Such a configuration, however, may provide relatively poor image quality for small pupil sizes (e.g., ≥2 millimeter pupil size).

Figure 5:
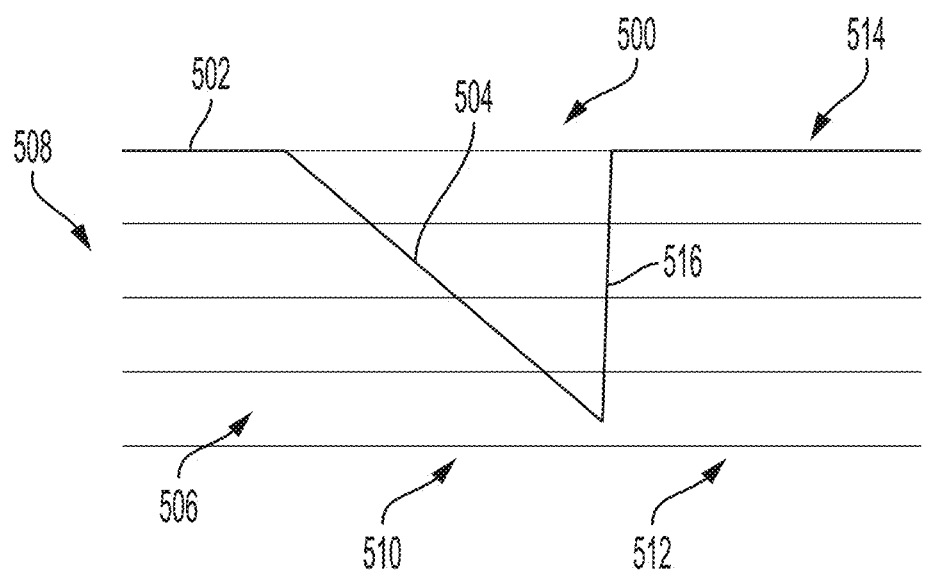
FIG. 5 illustrates a diffractive profile of a multi ring optic.

FIG. 5 illustrates a multi ring design, which may provide improved image quality for small pupil sizes. Improved distance imaging may be provided for small pupil sizes, and improved visual symptoms (e.g., reduced ring appearance in halo and lower glare and scatter) may be provided for all pupil sizes. Larger pupil sizes may have good image quality as well.

In the embodiment shown in FIG. 5, an optic may include a diffractive profile 500 including an interior echelette 502 and an outer echelette 504. The interior echelette 502 may be positioned at a central zone 506 of the optic, which may be positioned at the optical axis 508 of the optic. The outer echelette 504 may be adjacent to the interior echelette 502 and may extend radially outward from the interior echelette 502. The outer echelette 504 may be positioned at an intermediate zone 510 of the optic, that is between the central zone 506 and a peripheral zone 512.

In embodiments, a refractive zone 514 may be adjacent to the outer echelette 504 and may be positioned radially outward of the outer echelette 504. The refractive zone 514 may be positioned in the peripheral zone 512 as desired.

The echelettes 502, 504 may be adjacent to each other in embodiments, or in embodiments may be spaced from each other. In embodiments, the refractive zone 514 may be included or may be excluded or varied as desired.

The diffractive profile 500 may include only the interior echelette 502 and the outer echelette 504 in certain embodiments. The diffractive profile may include no more echelettes than the interior echelette 502 and the outer echelette 504, or no more than two rings. As such, the diffractive profile 500 may comprise a multi-ring design or two ring design in certain embodiments, such as shown in FIG. 5. This is in contrast with the single ring design shown in FIG. 4. In certain embodiments, a diffractive profile may include additional echelettes as desired.

The diffractive profile 500 may be configured such that the interior echelette 502 has a step height of no more than 0.2 wavelengths in embodiments. Such a step height may comprise a relatively low step height, and may comprise a zero step height in embodiments. FIG. 5, for example, illustrates the interior echelette 502 having a zero step height. The interior echelette 502 accordingly may have only refractive power in FIG. 5.

The interior echelette 502 may have a width in r-squared space (with r-squared space being described in regard to FIG. 3A) corresponding to a power of between 1 diopter and 5 diopters. Such a width may comprise a width of about 0.5 millimeters in embodiments (e.g., 0.569 millimeters or another amount), although other widths may be utilized as desired. A width of the echelettes may be determined based on a power of the echelette based on the following equation (with the width provided in r-squared): $r^2 = 2(\lambda/(\text{power in diopters}))$.

The outer echelette 504 may have a step height 516 of more than 0.2 wavelengths, but less than 2 wavelengths in embodiments. The outer echelette 504 may have a step height of about 2 micrometers, although other step heights may be utilized as desired. The outer echelette 504 may further have a width r-squared space corresponding to a power of between 1 diopter and 5 diopters. Such a width may comprise a width of about 0.5 millimeters in embodiments, although other widths may be utilized as desired. The outer echelette 504 may have a trailing edge positioned at about 1 millimeter from the optical axis (e.g., 0.955 millimeters or another amount as desired). In embodiments, the width of the interior echelette 502 in r-squared space may be the same as the width of the outer echelette 504 in r-squared space. In embodiments, the width of the interior echelette 502 in r-squared space may be different than the width of the outer echelette 504 in r-squared space.

Variations in the configurations of the diffractive profile may be provided as desired.

The configuration of the interior and outer echelettes 502, 504 accordingly may allow for improved distance imaging for small pupil sizes, and improved visual symptoms (e.g., reduced ring appearance in halo and lower glare and scatter) may be provided for all pupil sizes.

Figure 6:
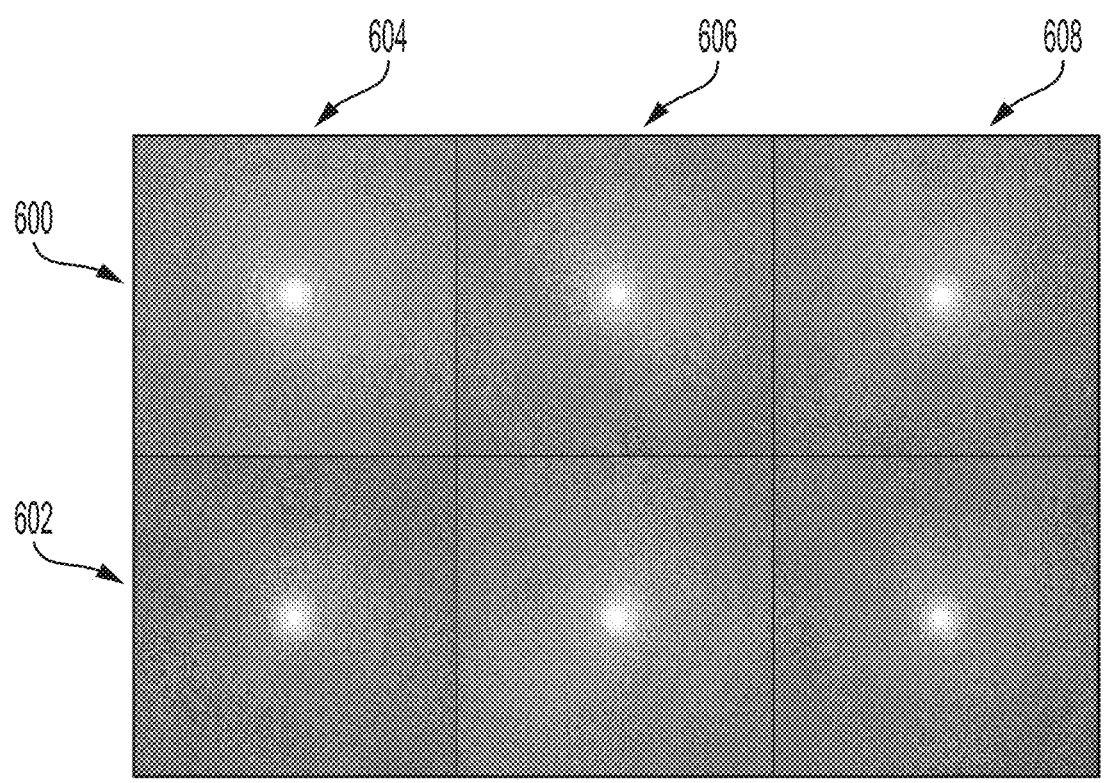
FIG. 6 illustrates images of halos for a multi ring optic compared to a single ring optic.

FIG. 6, for example, comprises images on the top row 600 of a design as shown in FIG. 4, comprising a single ring diffractive profile. The halo images are shown for 2 millimeter pupils in the first column 604, a 3 millimeter pupil in the second column 606, and a 4 millimeter pupil in the third column 608. The appearance of the halos is shown to be reduced in the images on the bottom row 602, which corresponds to a diffractive profile design as shown in FIG. 5, for the various pupil sizes (2 millimeter in column 604, 3 millimeter in column 606, and 4 millimeter in column 608). The beneficial effects of the diffractive pattern shown in FIG. 5 are particularly seen with smaller pupil sizes.

Figure 7:
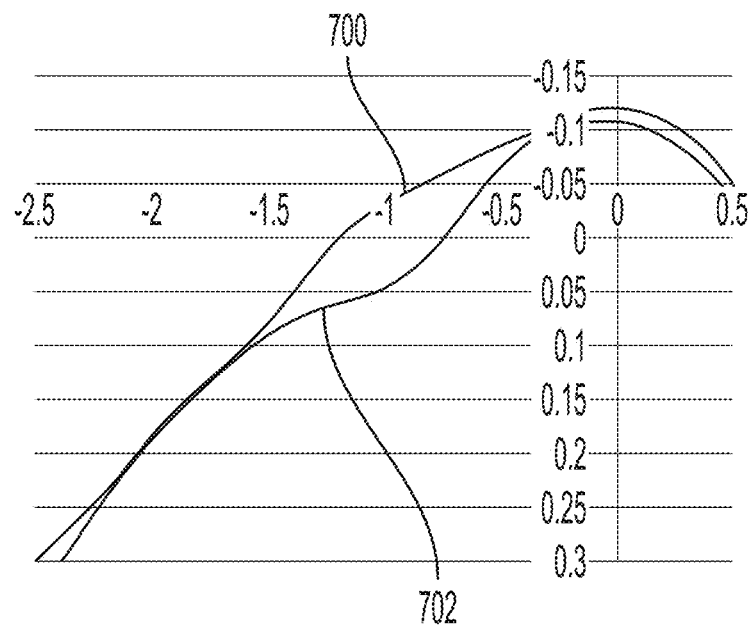
FIG. 7 illustrates a graph of visual acuity for a multi ring optic compared to a single ring optic.

FIG. 7 illustrates a graph of visual acuity for a 3 millimeter pupil in which the visual acuity of the design shown in FIG. 5 is marked as line 700, and the visual acuity of the design shown in FIG. 4 is marked as line 702. The visual acuity is shown to be improved for the design shown in FIG. 5, particularly at the 0 to −1.5 diopter range. The horizontal axis is in units of diopter and the vertical axis is shown in [logMAR] (Logarithm of the Minimum Angle of Resolution).

Figure 8:
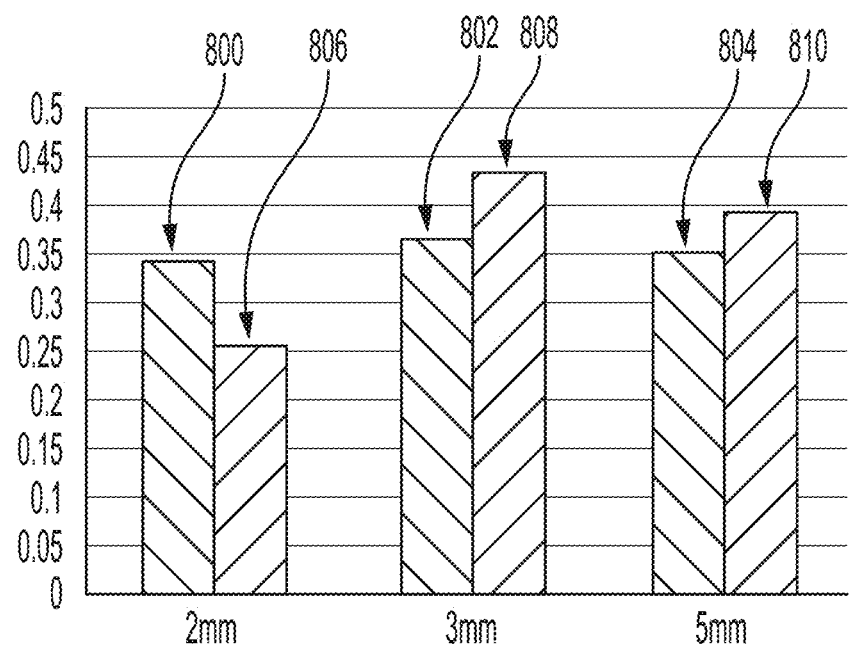
FIG. 8 illustrates a graph of contrast for a multi ring optic compared to a single ring optic.

FIG. 8 illustrates a graph of contrast, with the contrast at 2 millimeter, 3 millimeter, and 5 millimeter pupils shown for the design shown in FIG. 5 as bars 800, 802, and 804, respectively. These measures of contrast at various pupil sizes are compared to the contrast for the design shown in FIG. 4, as bars 806, 808, and 810, respectively. An arbitrary scaling is shown on the vertical axis.

Figure 9:
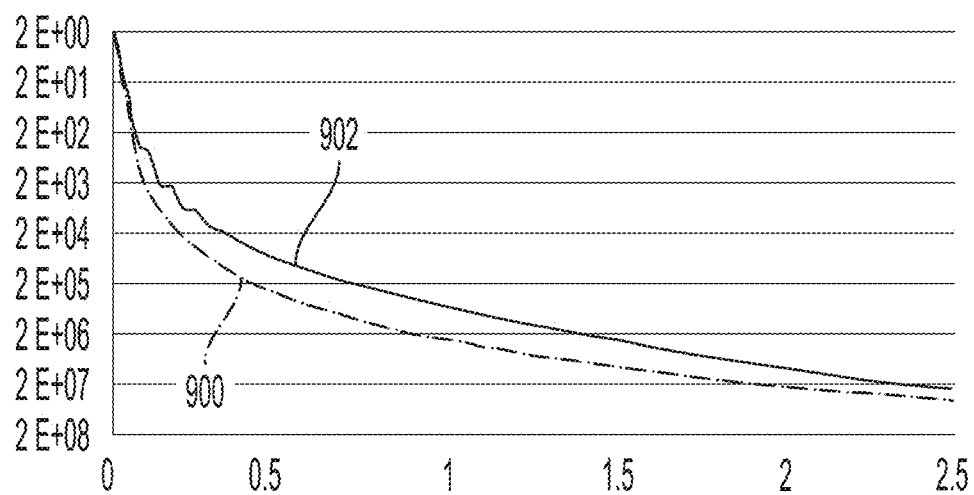
FIG. 9 illustrates a graph of halo intensity for a multi ring optic compared to a single ring optic.

FIG. 9 illustrates a graph of halo intensity, for a 2 millimeter pupil for the design shown in FIG. 5 as line 900. This measure of halo intensity is shown in comparison to the line 902 corresponding to the design shown in FIG. 4. A normalized scaling of irradiance (W/mm^2) is shown on the vertical axis.

Figure 10:
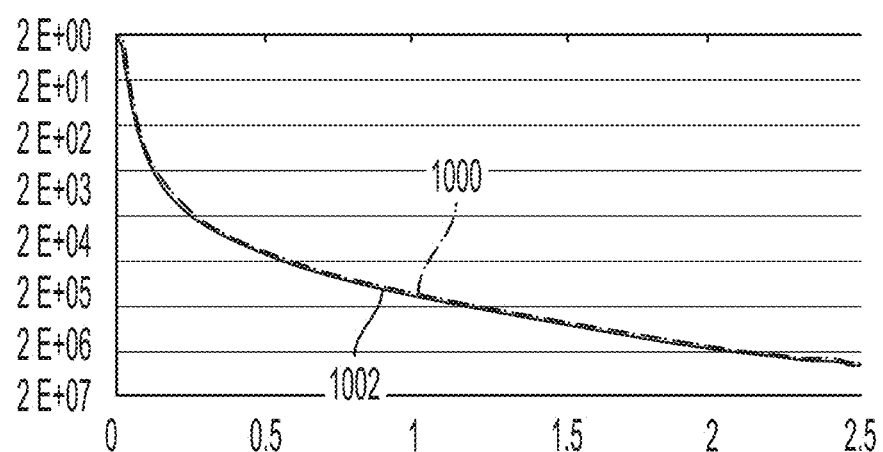
FIG. 10 illustrates a graph of halo intensity for a multi ring optic compared to a single ring optic.

FIG. 10 illustrates a graph of halo intensity, for a 3 millimeter pupil for the design shown in FIG. 5 as line 1000. This measure of halo intensity is shown in comparison to the line 1002 corresponding to the design shown in FIG. 4. A normalized scaling is shown on the vertical axis.

Figure 11:
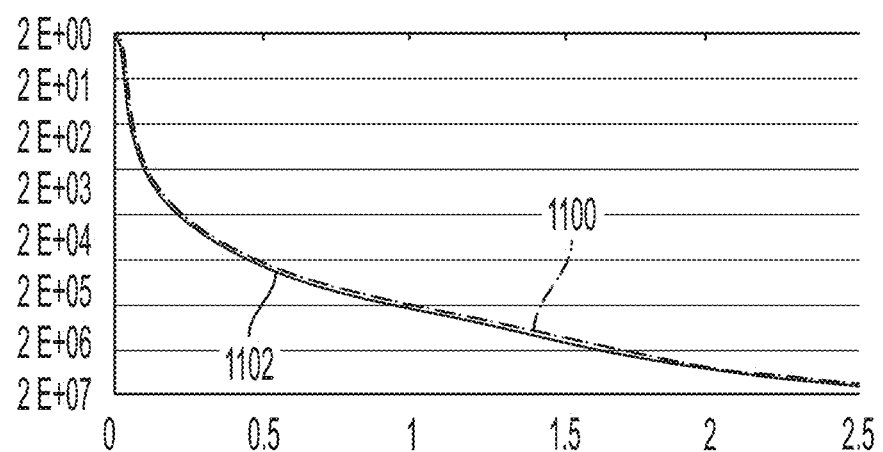
FIG. 11 illustrates a graph of halo intensity for a multi ring optic compared to a single ring optic.

FIG. 11 illustrates a graph of halo intensity, for a 4 millimeter pupil for the design shown in FIG. 5 as line 1100. This measure of halo intensity is shown in comparison to the line 1102 corresponding to the design shown in FIG. 4. A normalized scaling is shown on the vertical axis.

As such, improved visual results and reduced halo intensity are provided at smaller sized pupils.

In embodiments, variations in the diffractive profile may be provided. Each embodiment may include an optic including a diffractive profile including an interior echelette having a step height of no more than 0.2 wavelengths, and an outer echelette having a step height of more than 0.2 wavelengths and less then two wavelengths.

Figure 12:
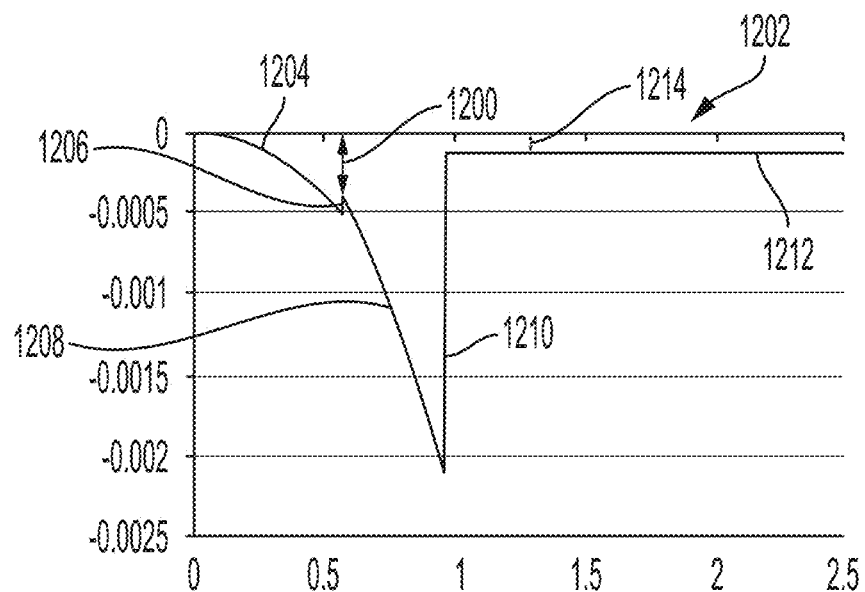
FIG. 12 illustrates a diffractive profile of a multi ring optic.

FIG. 12, for example, illustrates a diffractive profile 1202 having an interior echelette 1204 having a step height 1206 that is greater than zero and no more than 0.2 wavelengths. The interior echelette 1204 may lack a step offset. The outer echelette 1208 may have a step height 1210 that is more than 0.2 wavelengths and less than two wavelengths. The outer echelette 1208 further has a step offset 1200, and the refractive zone 1212 may further include a step offset 1214.

The interior echelette 1204 may have a step offset that is zero, and may extend to a radial distance of about 0.5 millimeters (e.g., 0.57 millimeters). The outer echelette 1208 may have a step height 1210 that is about 0.5 wavelengths, and may have a step offset 1200 of about 0.13 wavelengths. The outer echelette 1208 may extend to a radial distance of about 1 millimeter (e.g., 0.975 millimeters). The refractive zone 1212 may extend radially outward from the outer echelette 1208 to a distance of e.g., 2.5 millimeters, or another distance as desired. The step offset 1214 of the refractive zone 1212 may be about 0.02 wavelengths. Various other configurations of the echelettes 1204, 1208, and the refractive zone 1212 may be utilized.

Figure 13:
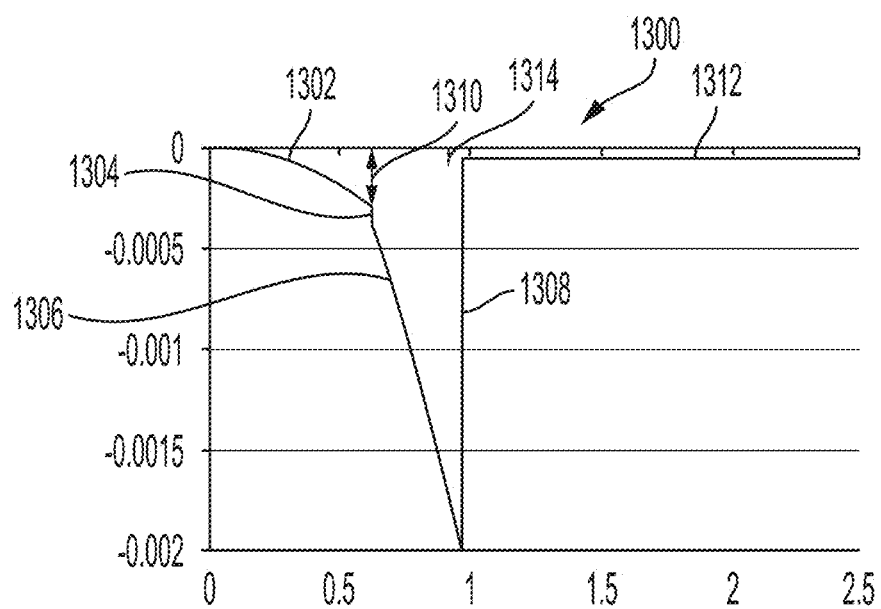
FIG. 13 illustrates a diffractive profile of a multi ring optic.

FIG. 13 illustrates an embodiment in which a diffractive profile 1300 has an interior echelette 1302 having a step height 1304 that is greater than zero and no more than 0.2 wavelengths. The interior echelette 1302 may lack a step offset. The outer echelette 1306 may have a step height 1308 that is more than 0.2 wavelengths and less than two wavelengths. The outer echelette 1306 further has a step offset 1310, and the refractive zone 1312 may further include a step offset 1314.

The interior echelette 1302 may have a step offset that is zero, and may extend to a radial distance of about 0.6 millimeters (e.g., 0.62 millimeters). The outer echelette 1306 may have a step height 1308 that is about 0.5 wavelengths, and may have a step offset 1310 of about 0.07 wavelengths. The outer echelette 1306 may extend to a radial distance of about 1 millimeter. The refractive zone 1312 may extend radially outward from the outer echelette 1306 to a distance of 2.5 millimeters, or another distance as desired. The step offset 1314 of the refractive zone 1312 may be about 0.02 wavelengths. Various other configurations of the echelettes 1302, 1306, and the refractive zone 1312 may be utilized.

Figure 14:
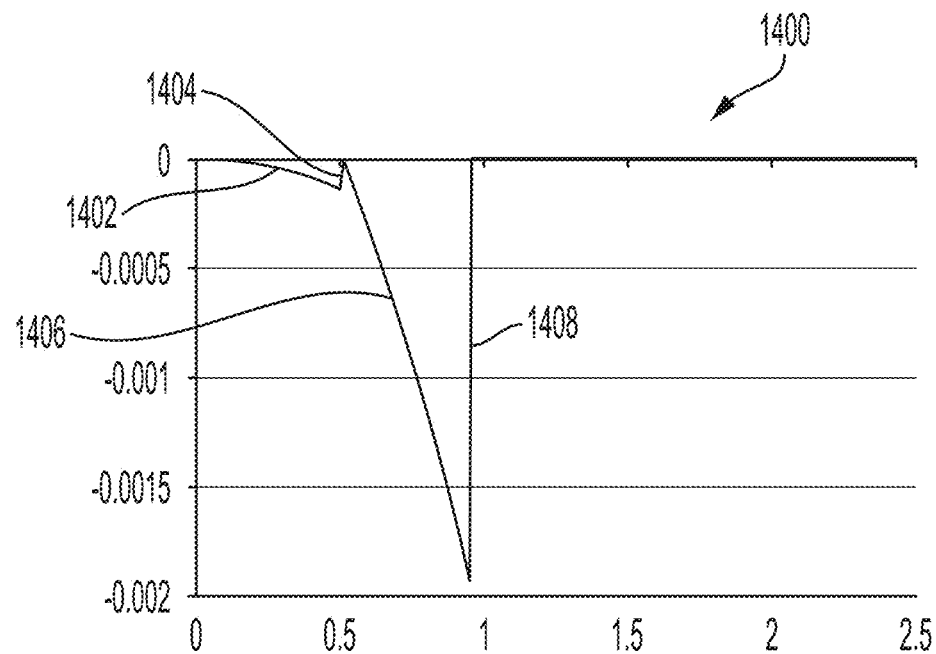
FIG. 14 illustrates a diffractive profile of a multi ring optic.

FIG. 14 illustrates an embodiment in which a diffractive profile 1400 has an interior echelette 1402 having a step height 1404 that is greater than zero and no more than 0.2 wavelengths. The interior echelette 1402 may lack a step offset. The outer echelette 1406 may have a step height 1408 that is more than 0.2 wavelengths and less than two wavelengths. The outer echelette 1406 may lack a step offset. A refractive zone may be positioned radially outward of the outer echelette 1406 and may lack a step offset.

The interior echelette 1402 may have a step offset that is zero, and may extend to a radial distance of about 0.6 millimeters (e.g., 0.62 millimeters). The interior echelette 1402 may have a step height 1404 that is about 0.02 wavelengths. The outer echelette 1406 may have a step height 1408 that is about 0.47 wavelengths. The outer echelette 1406 may extend to a radial distance of about 1 millimeter. The refractive zone may extend radially outward from the outer echelette 1406 to a distance of 2.5 millimeters, or another distance as desired. Various other configurations of the echelettes 1402, 1406, and the refractive zone may be utilized.

Figure 15:
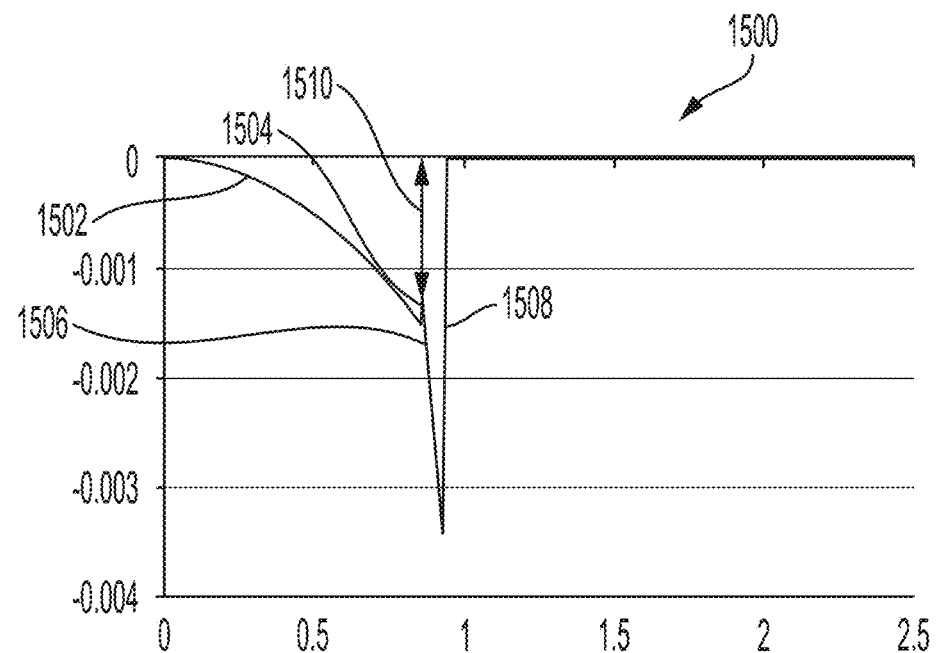
FIG. 15 illustrates a diffractive profile of a multi ring optic.

FIG. 15 illustrates an embodiment in which a diffractive profile 1500 has an interior echelette 1502 having a step height 1504 that is greater than zero and no more than 0.2 wavelengths. The outer echelette 1506 may have a step height 1508 that is more than 0.2 wavelengths and less than two wavelengths. The outer echelette 1506 further has a step offset 1510.

The interior echelette 1502 may have a step offset that is zero, and may extend to a radial distance of about 0.75 millimeters. The outer echelette 1506 may have a step height 1508 that is about 0.78 wavelengths, and may have a step offset 1510 of about 0.3 wavelengths. The outer echelette 1506 may extend to a radial distance of about 1 millimeter. The refractive zone may extend radially outward from the outer echelette 1506 to a distance of 2.5 millimeters, or another distance as desired. Various other configurations of the echelettes 1502, 1506, and the refractive zone may be utilized.

Figure 16:
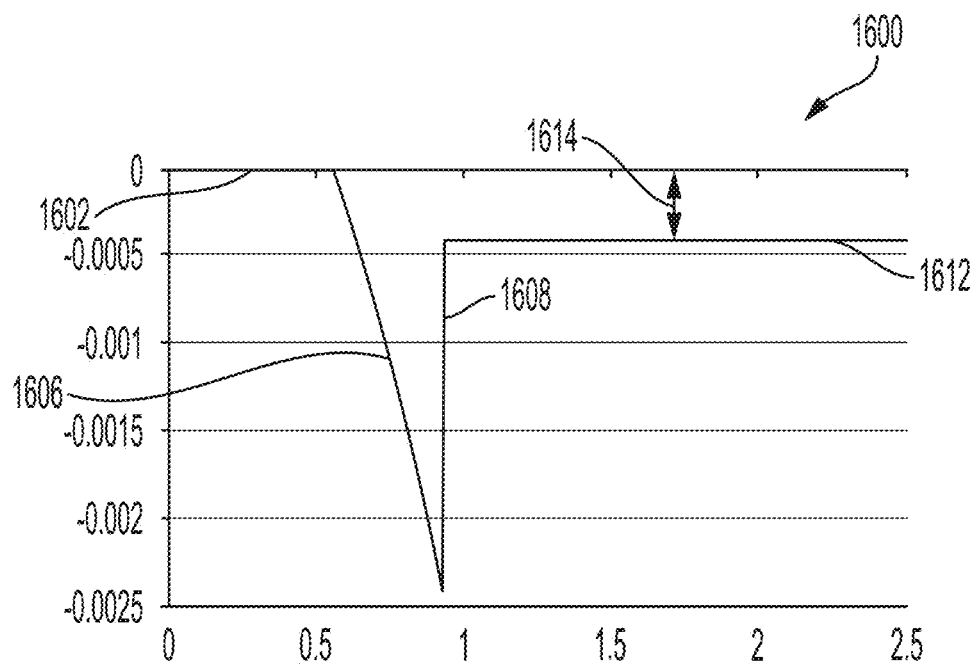
FIG. 16 illustrates a diffractive profile of a multi ring optic.

FIG. 16 illustrates an embodiment in which a diffractive profile 1600 has an interior echelette 1602 having an about zero step height. The interior echelette 1602 and the outer echelette 1606 may lack a step offset. The outer echelette 1606 may have a step height 1608 that is more than 0.2 wavelengths and less than two wavelengths. The refractive zone 1612 may include a step offset 1614.

The interior echelette 1602 may extend to a radial distance of about 0.6 millimeters. The outer echelette 1606 may have a step height 1608 that is about 0.8 wavelengths. The outer echelette 1606 may extend to a radial distance of about 1 millimeter. The refractive zone 1612 may extend radially outward from the outer echelette 1606 to a distance of e.g., 2.5 millimeters, or another distance as desired. The step offset 1614 of the refractive zone 1612 may be about 0.13 wavelengths. Various other configurations of the echelettes 1602, 1606, and the refractive zone 1612 may be utilized.

In the embodiments of FIGS. 12-16, each interior and outer echelette may have a width corresponding to a power of between 1 diopter and 5 diopters.

Figure 17:
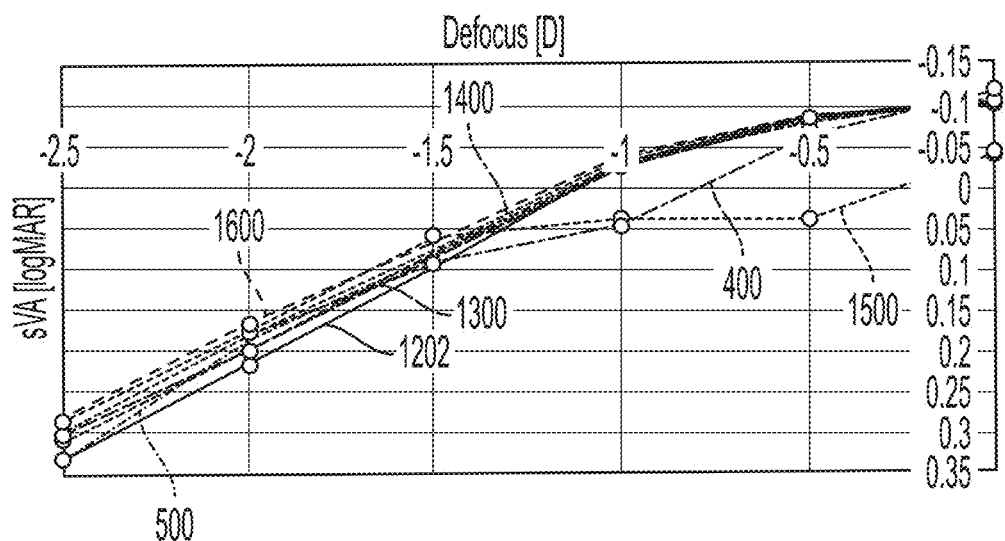
FIG. 17 illustrates a graph of visual acuity for multiple embodiments of a multi ring optic compared to a single ring optic.

The performance of the optics may be improved at smaller pupil sizes for each of the diffractive profiles shown in FIGS. 5 and 12-16. FIG. 17, for example, illustrates a graph of visual acuity, with each line marked to a respective one of the diffractive profiles shown in FIGS. 5 and 12-16 (e.g., profile 500, 1202, 1300, 1400, 1500, and 1600). The visual acuity is shown relative to the performance of the diffractive profile 400, which is shown to be improved over the performance of the profile 400 at least from 0 diopter to −1.5 diopters.

Figure 18:
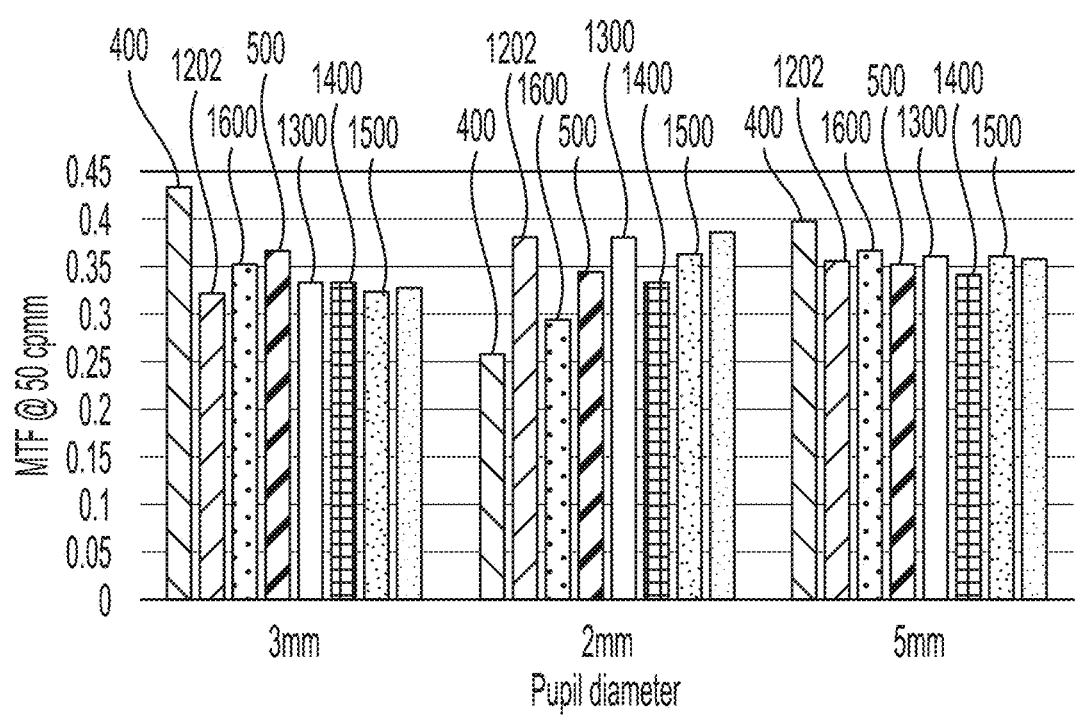
FIG. 18 illustrates a graph of modulation transfer function (MTF) for multiple embodiments of a multi ring optic compared to a single ring optic.

FIG. 18 illustrates a graph of modulation transfer function (MTF), with each bar marked to a respective one of the diffractive profiles shown in FIGS. 5 and 12-16 (e.g., profile 500, 1202, 1300, 1400, 1500, and 1600). The MTF is shown relative to the performance of the diffractive profile 400, which is shown to be improved over the performance of the profile 400 particularly at smaller pupil sizes.

Figure 19:
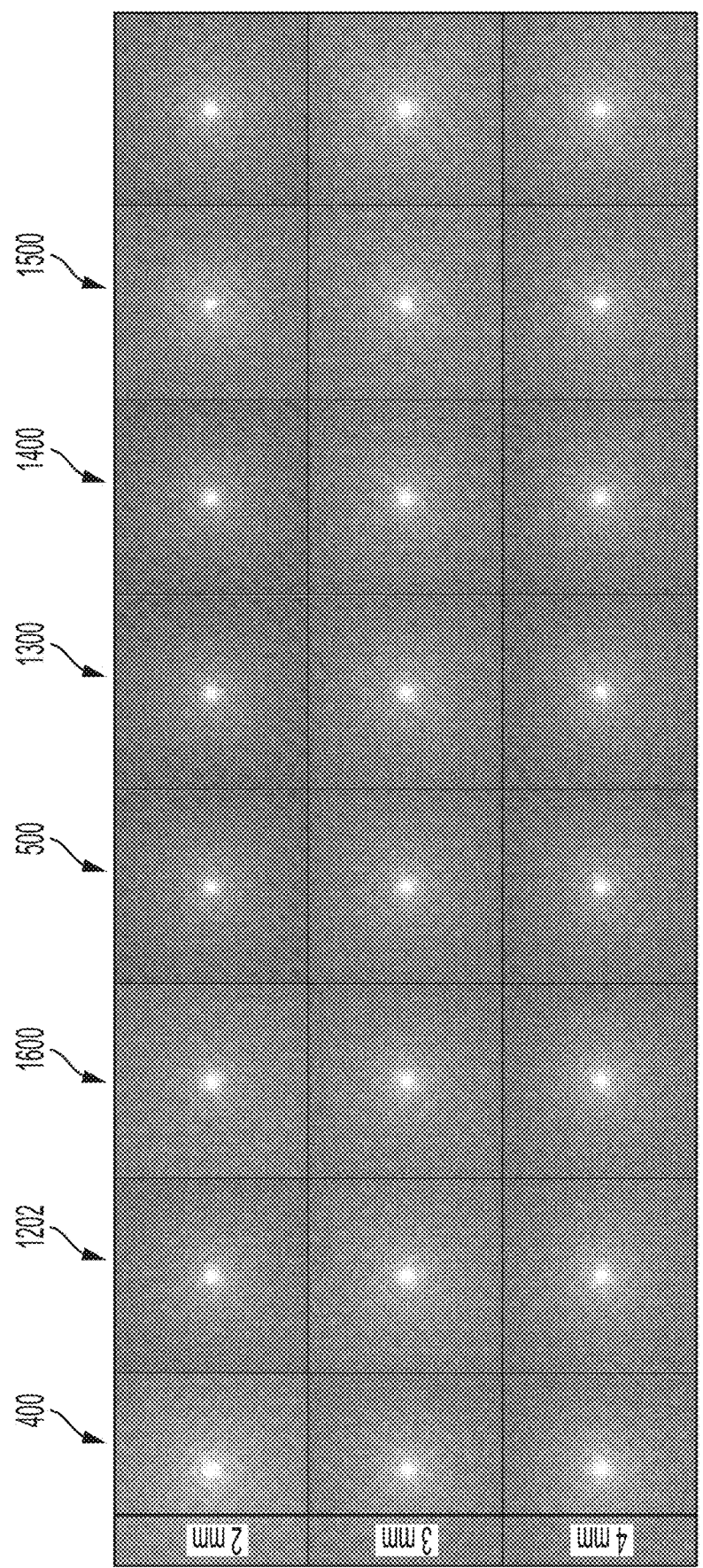
FIG. 19 illustrates a plurality of images of halo intensity for multiple embodiments of a multi ring optic at a variety of pupil sizes.

FIG. 19 illustrates images of halos, with the columns marked to a respective one of the diffractive profiles shown in FIGS. 5 and 12-16 (e.g., profile 500, 1202, 1300, 1400, 1500, and 1600). A variety of pupil sizes are shown along the rows. The halos are shown to be reduced relative to the performance of the diffractive profile 400, particularly at smaller pupil sizes.

An optic for an ophthalmic lens that includes a diffractive profile or refractive profile disclosed herein may be fabricated utilizing a variety of methods. A method may include determining optical aberrations of a patient's eye. Measurements of a patient's eye may be made in a clinical setting, such as by an optometrist, ophthalmologist, or other medical or optical professional. The measurements may be made via manifest refraction, autorefraction, tomography, or a combination of these methods or other measurement methods. The optical aberrations of the patient's eye may be determined.

A determination of the visual range of the patient may also be determined. For example, the ability of the patient to focus on near objects (presbyopia) may be measured and determined. A range of add power for the ophthalmic lens may be determined.

The measurements of the patient's eye may be placed in an ophthalmic lens prescription, which includes features of an optic that are intended to address the optical aberrations of the patient's eye, as well as features that address the visual range for the patient (e.g., an amount of add power and number of focuses to be provided by the optic).

The ophthalmic lens prescription may be utilized to fabricate an optic for the ophthalmic lens. A refractive profile of the optic may be determined based on the ophthalmic lens prescription, to correct for the optical aberrations of the patient's eye. Such a refractive profile may be applied to the optic, whether on a surface including the diffractive profile or on an opposite optical surface. The diffractive profile may also be determined to provide for the desired distribution of add power for the optic.

The determination of one or more of a refractive or diffractive profile and the fabrication of the optic may be performed remotely from the optometrist, ophthalmologist, or other medical or optical professional that performed the measurements of a patient's eye, or may be performed in the same clinical facility of such an individual. If performed remotely, the fabricated optic may be delivered to an optometrist, ophthalmologist, or other medical or optical professional, for being provided to a patient. For an intraocular lens, the fabricated optic may be provided for implant into a patient's eye.

The fabricated optic may be a custom optic fabricated specifically for the patient's eye, or may be fabricated in a manufacturing assembly and then selected by an optometrist, ophthalmologist, or other medical or optical professional for supply to a patient, which may include implantation in the patient's eye.

Figure 20:
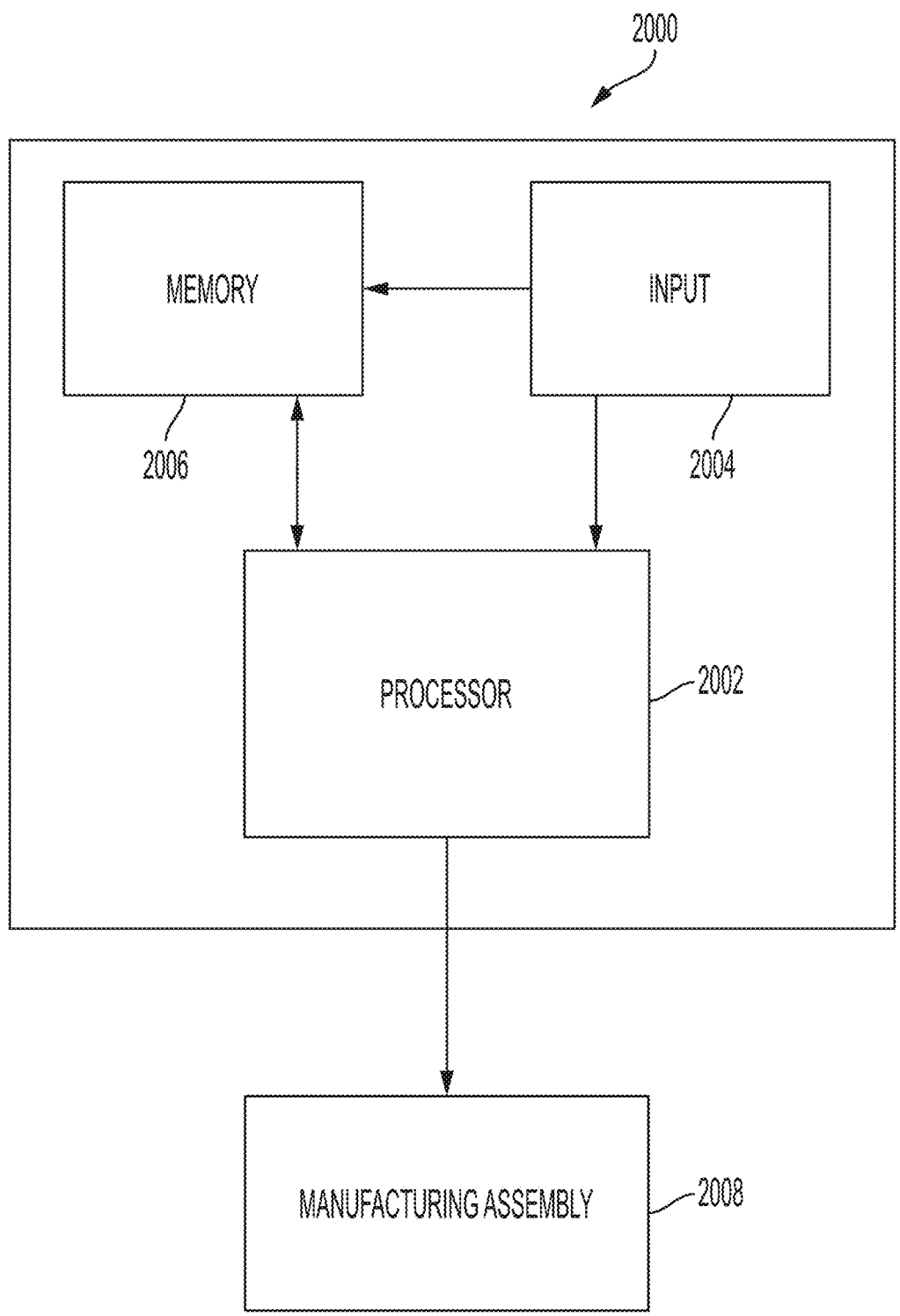
FIG. 20 illustrates an embodiment of a system.

FIG. 20 illustrates an embodiment of a system 2000 that may be utilized to perform all or a portion of the methods disclosed herein. The system 2000 may include a processor 2002, an input 2004, and a memory 2006. In certain embodiments the system 2000 may include a manufacturing assembly 2008.

The processor 2002 may comprise a central processing unit (CPU) or other form of processor. In certain embodiments the processor 2002 may comprise one or more processors. The processor 2002 may include one or more processors that are distributed in certain embodiments, for example, the processor 2002 may be positioned remote from other components of the system 2000 or may be utilized in a cloud computing environment. The memory 2006 may comprise a memory that is readable by the processor 2002. The memory 2006 may store instructions, or features of intraocular lenses, or other parameters that may be utilized by the processor 2002 to perform the methods disclosed herein. The memory 2006 may comprise a hard disk, read-only memory (ROM), random access memory (RAM) or other form of non-transient medium for storing data. The input 2004 may comprise a port, terminal, physical input device, or other form of input. The port or terminal may comprise a physical port or terminal or an electronic port or terminal. The port may comprise a wired or wireless communication device in certain embodiments. The physical input device may comprise a keyboard, touchscreen, keypad, pointer device, or other form of physical input device. The input 2004 may be configured to provide an input to the processor 2002.

The system 2000 may be utilized to perform the methods disclosed herein, such as the processes of determining a diffractive profile of the optic, as well as a refractive profile of the optic. The processor 2002 may be configured to determine the diffractive profile to provide for various add powers for the optic, as well as determining a refractive profile to correct for ocular aberrations of the patient.

The processor 2002 may provide the refractive profile and/or diffractive profile to the manufacturing assembly 2008, which may be configured to fabricate the optic for the ophthalmic lens based on the refractive profile and/or diffractive profile. The manufacturing assembly 2008 may comprise one or more apparatuses for forming the optic, and may comprise a high volume manufacturing assembly or a low volume manufacturing assembly. The manufacturing assembly 2008 may be used for manufacture remote to a clinic in which measurements of the individual's eye or made, or local to such a clinic. The manufacturing assembly may include apparatuses such as lathe tools, or other lens formation devices to fabricate the optic.

In one embodiment, the processor 2002 may be provided with an ophthalmic lens prescription for the individual's eye that may be provided as discussed herein. The processor 2002 may receive the ophthalmic lens via the input 2004. The system 2000 may fabricate the optic for the ophthalmic lens based on the prescription.

The system 2000 may be configured to fabricate any of the embodiments of ophthalmic lenses disclosed herein.

In one embodiment, a diffractive profile as disclosed herein may be positioned on a surface of a lens that is opposite an aspheric surface. The aspheric surface on the opposite side of the lens may be designed to reduce corneal spherical aberration of the patient.

In one embodiment, one or both surfaces of the lens may be aspherical, or include a refractive surface designed to extend the depth of focus, or create multifocality.

In one embodiment, a refractive zone on one or both surfaces of the lens may be utilized that may be the same size or different in size as one of the diffractive zones. The refractive zone includes a refractive surface designed to extend the depth of focus, or create multifocality.

Any of the embodiments of lens profiles discussed herein may be apodized to produce a desired result. The apodization may result in the step heights and step offsets of the echelettes being gradually varied according to the apodization, as to gradually increasing the amount of light in the distance focus as a function of pupil diameter.

The features of the optics disclosed herein may be utilized by themselves, or in combination with refractive profiles of the optics and/or with features providing for correction of chromatic aberrations (e.g., achromats, which may be diffractive).

The ophthalmic lenses disclosed herein in the form of intraocular lenses are not limited to lenses for placement in the individual's capsular bag. For example, the intraocular lenses may comprise those positioned within the anterior chamber of the eye. In certain embodiments the intraocular lenses may comprise "piggy back" lenses or other forms of supplemental intraocular lenses.

Features of embodiments may be modified, substituted, excluded, or combined as desired.

In addition, the methods herein are not limited to the methods specifically described, and may include methods of utilizing the systems and apparatuses disclosed herein.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only, and is not intended to limit the scope of systems, apparatuses, and methods as disclosed herein, which is defined solely by the claims. Accordingly, the systems, apparatuses, and methods are not limited to that precisely as shown and described.

Certain embodiments of systems, apparatuses, and methods are described herein, including the best mode known to the inventors for carrying out the same. Of course, variations on these described embodiments will become apparent to those of ordinary skill in the art upon reading the foregoing description. The inventor expects skilled artisans to employ such variations as appropriate, and the inventors intend for the systems, apparatuses, and methods to be practiced otherwise than specifically described herein. Accordingly, the systems, apparatuses, and methods include all modifications and equivalents of the subject matter recited in the claims appended hereto as permitted by applicable law. Moreover, any combination of the above-described embodiments in all possible variations thereof is encompassed by the systems, apparatuses, and methods unless otherwise indicated herein or otherwise clearly contradicted by context.

Groupings of alternative embodiments, elements, or steps of the systems, apparatuses, and methods are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

The terms "a," "an," "the" and similar referents used in the context of describing the systems, apparatuses, and methods (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the systems, apparatuses, and methods and does not pose a limitation on the scope of the systems, apparatuses, and methods otherwise claimed. No language in the present specification should be construed as indicating any non-claimed element essential to the practice of the systems, apparatuses, and methods.

All patents, patent publications, and other publications referenced and identified in the present specification are individually and expressly incorporated herein by reference in their entirety for the purpose of describing and disclosing, for example, the compositions and methodologies described in such publications that might be used in connection with the systems, apparatuses, and methods. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

What is claimed is:

1. An intraocular lens (IOL) comprising:
an optic comprising an anterior optical surface, a posterior optical surface, and an outer periphery, wherein one of the optical surfaces comprises a diffractive profile including an interior echelette having a step height of no more than 0.2 wavelengths and an outer echelette having a step height of more than 0.2 wavelengths and less than two wavelengths, and a refractive zone extending radially outward from the outer echelette to the outer periphery of the optic and adjacent to the outer echelette,
wherein the optic includes a central zone and the interior echelette is positioned at the central zone,
wherein the outer echelette is adjacent to the interior echelette,
wherein the interior echelette has a width corresponding to a power of between 1 diopter and 5 diopters.

2. The intraocular lens of claim 1, wherein the interior echelette has a width of about 0.5 millimeters.

3. The intraocular lens of claim 1, wherein the outer echelette has a width corresponding to a power of between 1 diopter and 5 diopters.

4. The intraocular lens of claim 3, wherein the outer echelette has a width of about 0.5 millimeters.

5. The intraocular lens of claim 1, wherein a width of the interior echelette in r-squared space is the same as a width of the outer echelette in r-squared space.

6. The intraocular lens of claim 1, wherein a width of the interior echelette in r-squared space is different than a width of the outer echelette in r-squared space.

7. The intraocular lens of claim 1, wherein the interior echelette is positioned at an optical axis of the optic.

8. The intraocular lens of claim 1, wherein the diffractive profile includes no more echelettes than the interior echelette and the outer echelette.

9. The intraocular lens of claim 1, wherein the interior echelette has a step height of zero.

10. The intraocular lens of claim 1, wherein the interior echelette has a step height that is greater than zero.

11. The intraocular lens of claim 1, wherein the outer echelette has a step offset.

\* \* \* \* \*